United States Patent
Masui et al.

(10) Patent No.: US 11,409,191 B2
(45) Date of Patent: Aug. 9, 2022

(54) PROJECTION OPTICAL SYSTEM AND PROJECTION APPARATUS

(71) Applicant: Konica Minolta, Inc., Tokyo (JP)

(72) Inventors: Atsuo Masui, Sakai (JP); Kazuhiko Inoue, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/889,924

(22) Filed: Jun. 2, 2020

(65) Prior Publication Data
US 2021/0003913 A1    Jan. 7, 2021

(30) Foreign Application Priority Data

Jul. 1, 2019  (JP) .............................. JP2019-122866

(51) Int. Cl.
| | |
|---|---|
| *G03B 21/28* | (2006.01) |
| *G02B 13/16* | (2006.01) |
| *G03B 21/14* | (2006.01) |
| *G02B 13/18* | (2006.01) |

(52) U.S. Cl.
CPC ............. *G03B 21/28* (2013.01); *G02B 13/16* (2013.01); *G02B 13/18* (2013.01); *G03B 21/14* (2013.01)

(58) Field of Classification Search
CPC ........ G02B 13/18; G02B 13/16; G03B 21/28; G03B 21/142; G03B 21/14
See application file for complete search history.

(56) References Cited

U.S. PATENT DOCUMENTS

| | | | | |
|---|---|---|---|---|
| 10,451,854 | B2 * | 10/2019 | Nagatoshi | ............. G02B 13/04 |
| 10,754,238 | B2 * | 8/2020 | Nagatoshi | ............. G03B 21/28 |
| 2016/0246034 | A1 * | 8/2016 | Amano | ............. G02B 13/0095 |
| 2016/0246037 | A1 * | 8/2016 | Amano | .................. G02B 13/22 |
| 2016/0246038 | A1 * | 8/2016 | Amano | ............. G02B 17/0896 |
| 2017/0351070 | A1 * | 12/2017 | Shiokawa | .......... G02B 27/0025 |

(Continued)

FOREIGN PATENT DOCUMENTS

| | | |
|---|---|---|
| CN | 108227118 A | 6/2018 |
| JP | 2018-097375 A | 6/2018 |
| JP | 2018-138944 A | 9/2018 |

OTHER PUBLICATIONS

Office Action issued in the counterpart Chinese Patent Application No. 202010597573.2, dated Jan. 19, 2022 (13 pages).

*Primary Examiner* — Magda Cruz

(74) *Attorney, Agent, or Firm* — Osha Bergman Watanabe & Burton LLP

(57) ABSTRACT

A projection optical system includes: a first optical system and a second optical system disposed in that order from an enlargement side. The second optical system forms an intermediate image of the image, and the first optical system enlarges and projects the intermediate image. The first optical system includes: a first lens group, a first reflecting optical element, and a part of a second lens group, disposed in that order from the enlargement side. The second optical system includes: a remainder of the second lens group, a second reflecting optical element, and a third lens group, disposed in that order from the enlargement side. The second reflecting optical element reflects light output from the third lens group toward the second lens group. The first reflecting optical element reflects light output from the second lens group toward the first lens group.

17 Claims, 25 Drawing Sheets

(56) References Cited

U.S. PATENT DOCUMENTS

2018/0164554 A1* 6/2018 Shiokawa .............. G02B 13/06
2018/0307041 A1* 10/2018 Masui ................ G02B 17/0896
2018/0321475 A1* 11/2018 Amano ................. G02B 13/22
2018/0321476 A1* 11/2018 Amano ................. G02B 13/22
2019/0011683 A1* 1/2019 Amano ................. G02B 13/22

* cited by examiner

PROJECTION OPTICAL SYSTEM AND PROJECTION APPARATUS

CROSS-REFERENCED TO RELATED APPLICATIONS

The entire disclosure of Japanese Patent Application No. 2019-122866, filed on Jul. 1, 2019, is incorporated herein by reference in its entirety.

TECHNICAL FIELD

The present disclosure relates to a projection optical system and a projection apparatus.

BACKGROUND

In recent years, there has been an increasing demand for mounting in a projection apparatus a projection optical system having a compact configuration and a wide angle of view. In order to meet such a demand, Japanese Laid-Open Patent Publication Nos. 2018-138944 and 2018-097375 disclose that in a relay type projection optical system that forms an intermediate image two reflecting optical elements are used to bend the optical axis of the projection optical system twice.

The projection optical system disclosed in Japanese Patent Application Laid-Open No. 2018-138944, however, has no lens group disposed between the two reflecting optical elements, and thus has a short distance between the two reflecting optical elements. A lens group disposed on the enlargement side with respect to the two reflecting optical elements is disposed near the main body of the projection apparatus including an image display element in a direction perpendicular to the optical axis of the lens group on the enlargement side. In addition, the lens group on the enlargement side has a shorter length than a lens group disposed on the reduction side (i.e., a side closer to the main body) with respect to the two reflecting optical elements. This causes a part of the light projected from the projection optical system to be blocked by the main body of the projection apparatus.

The projection optical system disclosed in Japanese Laid-Open Patent Publication No. 2018-097375 is also such that a lens group disposed on the enlargement side with respect to the two reflecting optical elements has a shorter length than a lens group disposed on the reduction side (or a side closer to the main body) with respect to the two reflecting optical elements. This causes a part of the light projected from the projection optical system to be blocked by the main body of the projection apparatus.

SUMMARY

One or more embodiments of the present invention provide a projection optical system and projection apparatus having a compact configuration and a wide angle of view, and capable of preventing projected light from having a portion blocked by the main body of the projection apparatus.

According to one or more embodiments of the present invention, a projection optical system enlarges and projects an image displayed on an image display surface, and is substantially composed of a first optical system and a second optical system in order from an enlargement side. The second optical system forms an intermediate image of the image. The first optical system enlarges and projects the intermediate image. The first optical system is substantially composed of a first lens group, a first reflecting optical element, and a part of a second lens group in order from the enlargement side. The second optical system is substantially composed of the remainder of the second lens group, a second reflecting optical element, and a third lens group in order from the enlargement side. The second reflecting optical element reflects toward the second lens group light output from the third lens group. The first reflecting optical element reflects toward the first lens group light output from the second lens group. The first lens group and the third lens group are disposed on the projection side with respect to the second lens group. The following conditional formula (1):

$$T1/T3 > 1.0 \tag{1}$$

is satisfied, where

T1: a distance on the optical axis from a surface of the first lens group closest to the enlargement side to a surface of the first lens group closest to the reduction side, and T3: a distance on the optical axis from a surface of the third lens group closest to the enlargement side to a surface of the third lens group closest to the reduction side.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
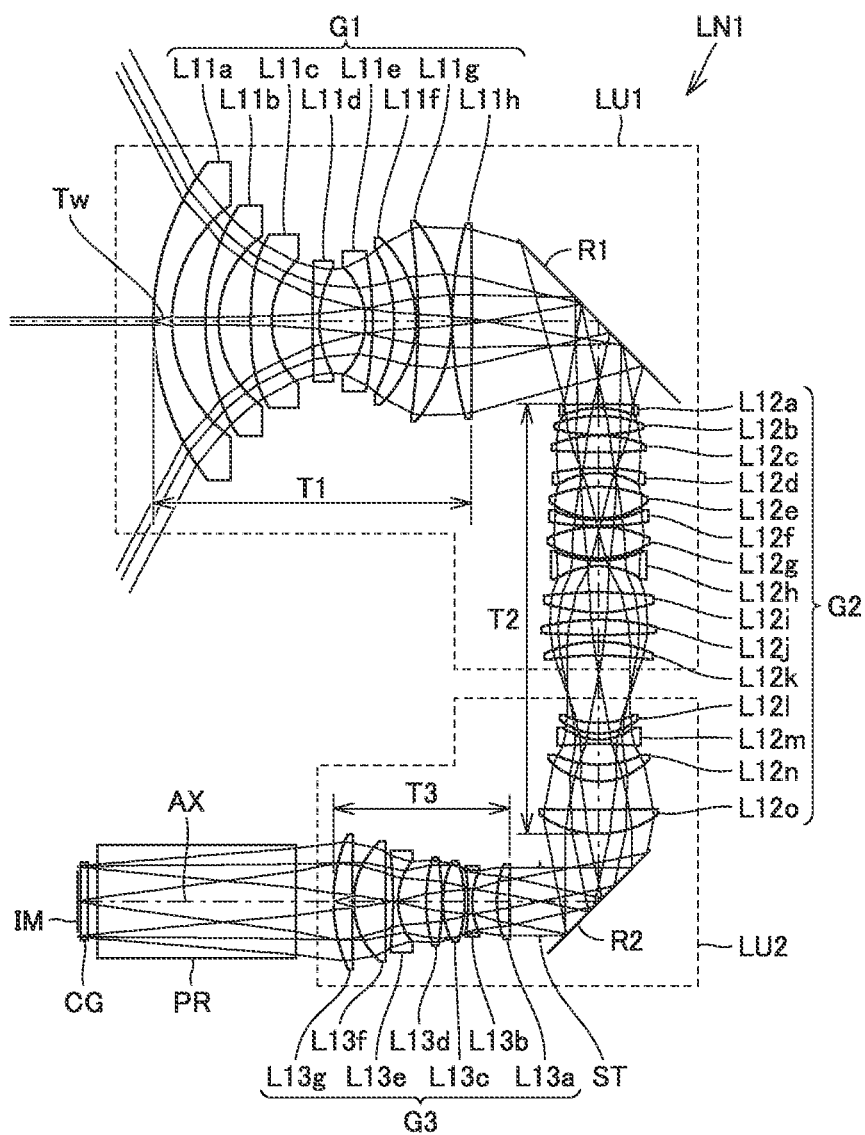
FIG. 1 shows a configuration of a projection optical system according to one or more embodiments.
Figure 2:
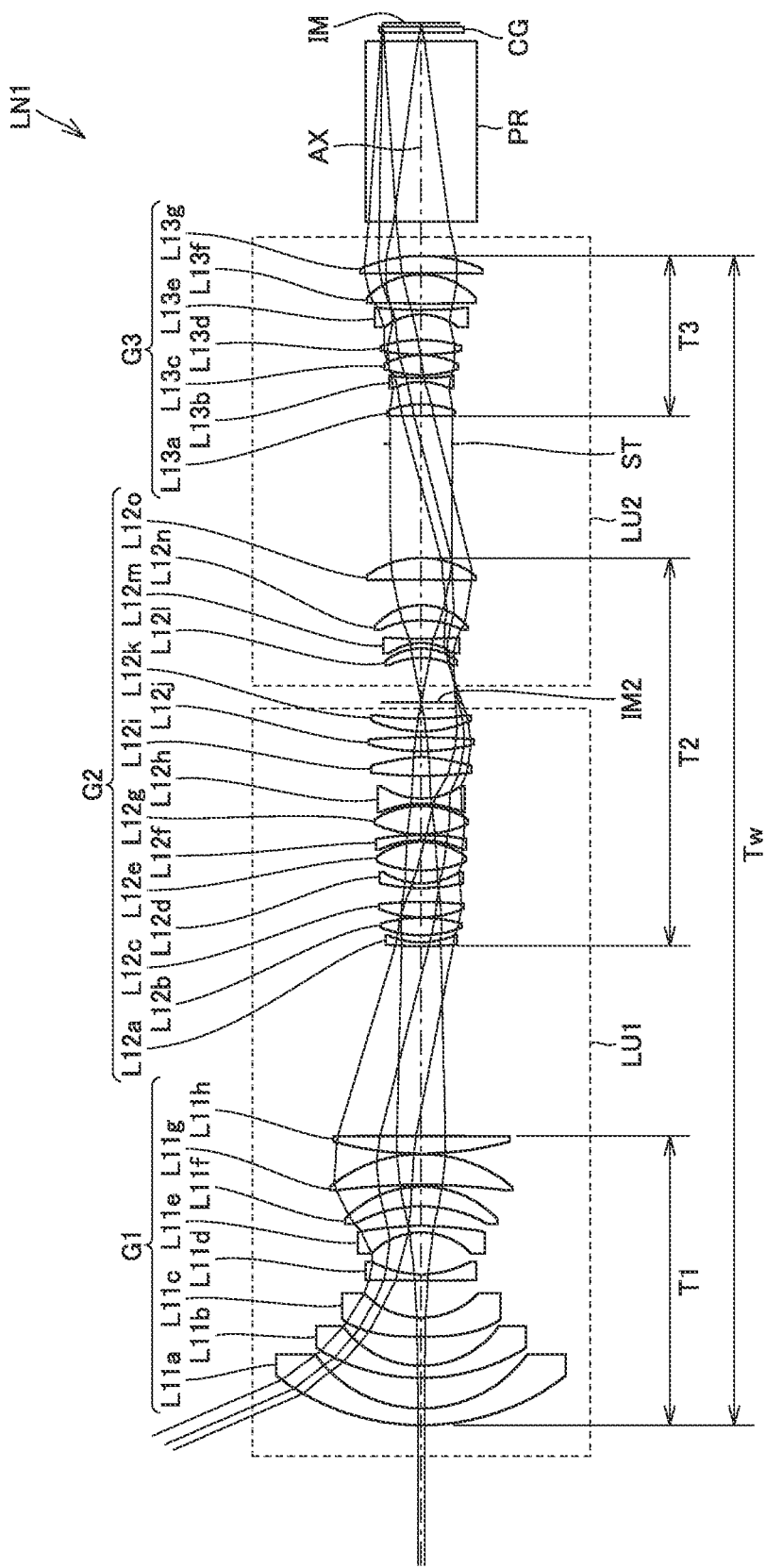
FIG. 2 is a developed view of the projection optical system according to one or more embodiments.

Hereinafter, one or more embodiments of the present invention will be described with reference to the drawings. However, the scope of the invention is not limited to the disclosed embodiments.

Hereinafter, a projection optical system and a projection apparatus according to one or more embodiments of the present invention will be described with reference to the drawings. Note, however, that the scope of the invention is not limited to the disclosed embodiments. The projection optical system according to one or more embodiments enlarges and projects an image displayed on an image display surface, and is substantially composed of a first optical system and a second optical system in order from the enlargement side. The second optical system forms an intermediate image of the image. The first optical system enlarges and projects the intermediate image. The first optical system is substantially composed of a first lens group, a first reflecting optical element, and a part of a second lens group in order from the enlargement side. The second optical system is substantially composed of the remainder of the second lens group, a second reflecting optical element, and a third lens group in order from the enlargement side. The second reflecting optical element reflects toward the second lens group light output from the third lens group. The first reflecting optical element reflects toward the first lens group light output from the second lens group. The first lens group and the third lens group are disposed on the projection side with respect to the second lens group. T1/T3 satisfies the following conditional formula (1):

$$T1/T3 > 1.0 \tag{1},$$

where

T1: a distance on the optical axis from a surface of the first lens group closest to the enlargement side to a surface of the first lens group closest to the reduction side, and T3: a distance on the optical axis from a surface of the third lens group closest to the enlargement side to a surface of the third lens group closest to the reduction side.

The enlargement side means a side on the optical axis of the projection optical system that is closer to a screen surface on which an enlarged optical image is projected (or an enlargement-side image surface) (i.e., a so-called front side). The reduction side is a side on the optical axis of the projection optical system on which an image display element having an image display surface is disposed (i.e., a so-called rear side). The projection side means a side closer to the screen surface on which an enlarged optical image is projected (or the enlargement-side image surface).

The projection optical system according to one or more embodiments is a relay-type projection optical system that is substantially composed of a second optical system that forms an intermediate image and a first optical system that enlarges and projects the intermediate image. Further, the projection optical system has an optical axis bent twice by the first reflecting optical element and the second reflecting optical element, and the first lens group and the third lens group are disposed on the projection side with respect to the second lens group. The projection optical system according to one or more embodiments thus has a compact configuration and a wide angle of view.

The conditional formula (1) defines a ratio of a first length of the first lens group on the optical axis of the projection optical system to a third length of the third lens group on the optical axis of the projection optical system. As the projection optical system according to one or more embodiments satisfies the conditional formula (1), a surface of the projection optical system closest to the enlargement side is located more frontward, that is, closer to the main body of the projection apparatus, in the direction of the optical axis of the first lens group. As the projection optical system includes the second lens group between the first reflecting optical element and the second reflecting optical element, the surface of the projection optical system closest to the enlargement side is located farther away from the main body of the projection apparatus in a direction perpendicular to the optical axis of the first lens group. The projection optical system according to one or more embodiments can thus prevent projected light from having a portion blocked by the main body of the projection apparatus.

Furthermore, the first reflecting optical element and the second reflecting optical element are located away from the intermediate image. Even if dust adheres to a first reflecting surface of the first reflecting optical element or a second reflecting surface of the second reflecting optical element, the dust can be prevented from being reflected on the screen surface (or a projection receiving surface).

In the projection optical system according to one or more embodiments, T1/T3 may satisfy the following conditional formula (1a):

$$1.2 < T1/T3 < 3.0 \tag{1a}.$$

The conditional formula (1a) defines a condition range within the condition range defined by the conditional formula (1). Therefore, when T1/T3 satisfies the conditional formula (1a), the above effect can further be enhanced. Since T1/T3 is less than the upper limit of the conditional formula (1a), the projection optical system is reduced in size in the direction of the optical axis of the first lens group.

In the projection optical system according to one or more embodiments, T2/T3 may satisfy the following conditional formula (2):

$$1.5 < T2/T3 < 5.0 \tag{2},$$

where T2: a distance on the optical axis from a surface of the second lens group closest to the enlargement side to a surface of the second lens group closest to the reduction side.

The conditional formula (2) defines a ratio of a second length of the second lens group on the optical axis of the projection optical system to the third length of the third lens group on the optical axis of the projection optical system. Since T2/T3 is larger than the lower limit of the conditional formula (2), a surface of the projection optical system closest to the enlargement side is located farther away from the main body of the projection apparatus in the direction of the optical axis of the second lens group. This can more reliably prevent projected light from having a portion blocked by the main body of the projection apparatus. Since T2/T3 is less than the upper limit of the conditional formula (2), the projection optical system is reduced in size in the direction of the optical axis of the second lens group.

In the projection optical system according to one or more embodiments, T2/T3 may satisfy the following conditional formula (2a):

$$2.0 < T2/T3 < 4.5 \quad (2a).$$

The conditional formula (2a) defines a condition range within the condition range defined by the conditional formula (2). Therefore, when T2/T3 satisfies the conditional formula (2a), the above effect can further be enhanced.

In the projection optical system according to one or more embodiments, T2/Tw may satisfy the following conditional formula (3):

$$0.3 < T2/Tw < 0.5 \quad (3),$$

where Tw: a distance on the optical axis from a surface of the projection optical system closest to the enlargement side to a surface of the projection optical system closest to the reduction side.

The conditional formula (3) defines a ratio of the length of the second lens group on the optical axis of the projection optical system to the total length of the projection optical system on the optical axis of the projection optical system. Since T2/Tw exceeds the lower limit of the conditional formula (3), the surface of the projection optical system closest to the enlargement side is located farther away from the main body of the projection apparatus in the direction of the optical axis of the second lens group. This can more reliably prevent projected light from having a portion blocked by the main body of the projection apparatus. Further, since T2/Tw exceeds the lower limit of the conditional formula (3), the projection optical system is reduced in size in the direction of the optical axis of the first lens group and the direction of the optical axis of the third lens group. Since T2/Tw is less than the upper limit of the conditional formula (3), the projection optical system is reduced in size in the direction of the optical axis of the second lens group.

In the projection optical system according to one or more embodiments, T2/Tw may satisfy the following conditional formula (3a):

$$0.32 < T2/Tw < 0.45 \quad (3a).$$

The conditional formula (3a) defines a condition range within the condition range defined by the conditional formula (3). Therefore, when T2/Tw satisfies the conditional formula (3a), the above effect can further be enhanced.

The projection optical system according to one or more embodiments may function as a monofocal lens allowing projection at an angle of view of 100° or larger. Accordingly, the projection optical system has a wide angle of view. The projection optical system allows an image displayed on the image display surface to be projected in a large size at a short distance.

The projection optical system according to one or more embodiments may function as a monofocal lens allowing projection at an angle of view of 120° or larger. This can further enhance the above effect.

In the projection optical system according to one or more embodiments, an optical axis of the first lens group and an optical axis of the third lens group may be substantially parallel to each other. This allows the projection optical system to be reduced in size in a direction perpendicular to the optical axis of the first lens group.

In the projection optical system according to one or more embodiments, the first reflecting optical element may bend the optical path of the projection optical system at a first angle of 90°. When the first reflecting optical element bending the optical path of the projection optical system at the first angle of 90° is compared with the first reflecting optical element bending the optical path of the projection optical system at a first angle of less than 90°, the former prevents the first lens group and the second lens group from mechanically interfering with each other. Further, when the first reflecting optical element bending the optical path of the projection optical system at the first angle of 90° is compared with the first reflecting optical element bending the optical path of the projection optical system at a first angle exceeding 90°, the former allows the projection optical system to be reduced in size in the direction of the optical axis of the first lens group.

In the projection optical system according to one or more embodiments, the second reflecting optical element may bend the optical path of the projection optical system at a second angle of 90°. When the second reflecting optical element bending the optical path of the projection optical system at the second angle of 90° is compared with the second reflecting optical element bending the optical path of the projection optical system at a second angle of less than 90°, the former prevents the second lens group and the third lens group from mechanically interfering with each other. Further, when the second reflecting optical element bending the optical path of the projection optical system at the second angle of 90° is compared with the second reflecting optical element bending the optical path of the projection optical system at a second angle exceeding 90°, the former allows the projection optical system to be reduced in size in the direction of the optical axis of the third lens group.

In the projection optical system according to one or more embodiments, the first reflecting optical element or the second reflecting optical element may be a plane mirror. This can reduce the cost of the projection optical system.

The projection optical system, first reflecting optical element, or second reflecting optical element according to one or more embodiments may be a right-angle prism which is a triangular prism with the right-angle prism having an oblique side serving as a reflecting surface. This allows a part of a space for bending the optical path (or optical axis) of the projection optical system to be filled with a material (e.g., glass) for the right-angle prism having a refractive index larger than that of air. This allows the space for bending the optical path (or optical axis) of the projection optical system to be reduced in size, and the projection optical system to be miniaturized.

A projection apparatus according to one or more embodiments includes an image display element having an image display surface, and the projection optical system according to one or more embodiments that enlarges and projects an image displayed on the image display surface. The projection apparatus according to one or more embodiments can thus have a compact configuration and a wide angle of view, and also prevent projected light from having a portion blocked by the main body of the projection apparatus.

<Specific Optical Configuration of Projection Optical System According to Embodiments of the Present Invention>

Specific optical configurations of projection optical systems LN1 to LN8 of one or more embodiments will be described with reference to FIGS. 1 to 16. Projection optical systems LN1 to LN8 enlarge and project an image displayed on an image display surface IM of an image display element 7 (see FIG. 26). A prism PR (for example, a total internal reflection (TIR) prism, a color separation/combination prism, or the like) and a cover glass CG that covers image display surface IM of image display element 7 are disposed on the reduction side of projection optical systems LN1 to LN8.

Projection optical system LN1 according to one or more embodiments will be described with reference to FIG. 1. Projection optical system LN1 functions as a monofocal lens allowing projection at an angle of view of 100° or larger. Projection optical system LN1 is substantially composed of a first optical system LU1 and a second optical system LU2 in order from the enlargement side. In the present specification, the fact that projection optical system LN1 is substantially composed of first optical system LU1 and second optical system LU2 means that projection optical system LN1 is composed of first optical system LU1 and second optical system LU2 or that projection optical system LN1 is composed of first optical system LU1, second optical system LU2, and another optical system having no lens power. Projection optical system LN1 has a distance Tw on an optical axis AX from a surface of projection optical system LN1 closest to the enlargement side (a surface of a first lens group G1 closest to the enlargement side) to a surface of projection optical system LN1 closest to the reduction side (a surface of a third lens group G3 closest to the reduction side). Projection optical system LN1 includes 30 lenses L11a to L11h, L12a to L12o, and L13a to L13g.

Second optical system LU2 forms an intermediate image IM2 of an image displayed on image display surface IM of image display element 7 (or an image surface on the reduction side). First optical system LU1 enlarges and projects intermediate image IM2.

First optical system LU1 is substantially composed of first lens group G1, a first reflecting optical element R1, and a part of a second lens group G2 in order from the enlargement side. In the present specification, the fact that first optical system LU1 is substantially composed of first lens group G1, first reflecting optical element R1, and a part of second lens group G2 means that first optical system LU1 is composed of first lens group G1, first reflecting optical element R1, and a part of second lens group G2, or that first optical system LU1 is composed of first lens group G1, first reflecting optical element R1, a part of second lens group G2, and another lens group having no refractive power. Part of second lens group G2 is a plurality of lenses of second lens group G2 that are disposed on the enlargement side with respect to intermediate image IM2.

First optical system LU1 is composed of 19 lenses L11a to L11h and L12a to L12k. First lens group G1 is composed of eight lenses L11a to L11h. Part of second lens group G2 is composed of 11 lenses L12a to L12k. First lens group G1 has a positive refractive power. First lens group G1 has a distance T1 on optical axis AX from a surface of first lens group G1 closest to the enlargement side to a surface of first lens group G1 closest to the reduction side.

Second optical system LU2 is substantially composed of the remainder of second lens group G2, a second reflecting optical element R2, and third lens group G3 in order from the enlargement side. In the present specification, the fact that second optical system LU2 is substantially composed of the remainder of second lens group G2, second reflecting optical element R2, and third lens group G3 means that second optical system LU2 is composed of the remainder of second lens group G2, second reflecting optical element R2, and third lens group G3, or that second optical system LU2 is composed of the remainder of second lens group G2, second reflecting optical element R2, third lens group G3 and another lens group having no refractive power. The remainder of second lens group G2 is a plurality of lenses of second lens group G2 that are disposed on the reduction side with respect to intermediate image IM2.

Second optical system LU2 includes 11 lenses L12l to L12o and L13a to L13g. The remainder of second lens group G2 is composed of four lenses L12l to L12o. Second lens group G2 is composed of 15 lenses L12a to L12o. Third lens group G3 is composed of seven lenses L13a to L13g. Second lens group G2 has a positive refractive power. Third lens group G3 has a positive refractive power. Second lens group G2 has a distance T2 on optical axis AX from a surface of second lens group G2 closest to the enlargement side to a surface of second lens group G2 closest to the reduction side. Third lens group G3 has a distance T3 on optical axis AX from a surface of third lens group G3 closest to the enlargement side to a surface of third lens group G3 closest to the reduction side.

An aperture stop ST is disposed in second optical system LU2. Specifically, aperture stop ST is disposed between second reflecting optical element R2 and third lens group G3.

Second reflecting optical element R2 reflects toward second lens group G2 light output from third lens group G3. Second reflecting optical element R2 bends the optical path (or optical axis AX) of projection optical system LN1. Second reflecting optical element R2 may bend the optical path (or optical axis AX) of projection optical system LN1 at a second angle of 90°. Second lens group G2 may have an optical axis orthogonal to that of third lens group G3. Second reflecting optical element R2 is a plane mirror.

First reflecting optical element R1 reflects toward first lens group G1 light output from second lens group G2. First reflecting optical element R1 bends the optical path (or optical axis AX) of projection optical system LN1. First reflecting optical element R1 may bend the optical path (or optical axis AX) of projection optical system LN1 at a first angle of 90°. First lens group G1 may have an optical axis orthogonal to that of second lens group G2. First reflecting optical element R1 is a plane mirror.

The optical axis of first lens group G1 and the optical axis of third lens group G3 are substantially parallel to each other. In the present specification, the fact that the optical axis of first lens group G1 and the optical axis of third lens group G3 are substantially parallel to each other means that the optical axis of first lens group G1 and the optical axis of third lens group G3 are substantially parallel to each other or that the optical axis of first lens group G1 and the optical axis of third lens group G3 form an angle of 2° or smaller.

Projection optical system LN1 has an optical path (or optical axis AX) bent twice by first reflecting optical element R1 and second reflecting optical element R2. First lens group G1 and third lens group G3 are disposed on the projection side with respect to second lens group G2.

In one or more embodiments, prism PR optically combines a plurality of images of a plurality of image display elements 7 (see FIG. 26) and guides the optically combined images to projection optical system LN1. Projection optical system LN1 is optimized, for example, for a three-panel projection apparatus.

In modifications of one or more embodiments, focusing may be performed by moving some of the lenses of projection optical system LN1 along optical axis AX of projection optical system LN1. Specifically, focusing may be performed by moving five lenses L11d to L11h of first lens group G1 disposed closer to first reflecting optical element R1 along optical axis AX of projection optical system LN1. Alternatively, focusing may be performed by moving second lens L12j of second lens group G2 that is disposed on the enlargement side of intermediate image IM2 and is the second lens as counted from intermediate image IM2 along optical axis AX of projection optical system LN1.

Figure 3:
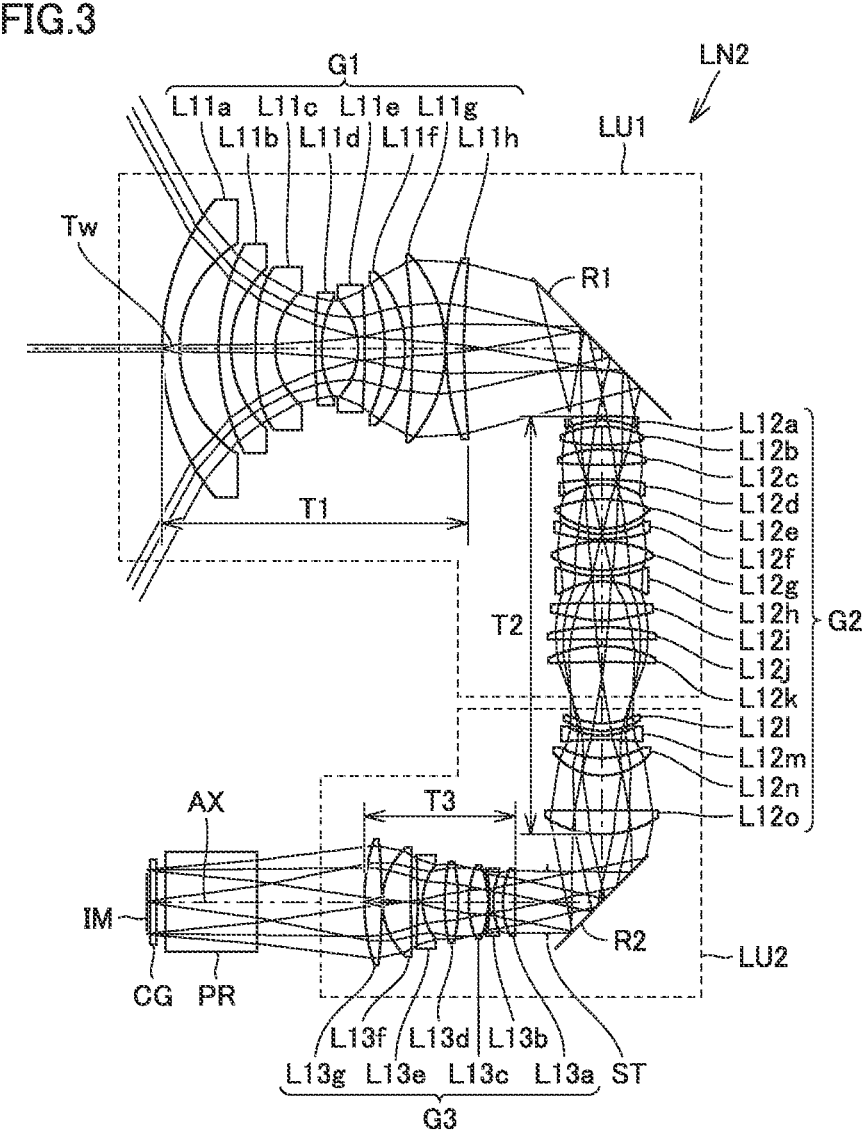
FIG. 3 shows another configuration of a projection optical system according to one or more embodiments.
Figure 4:
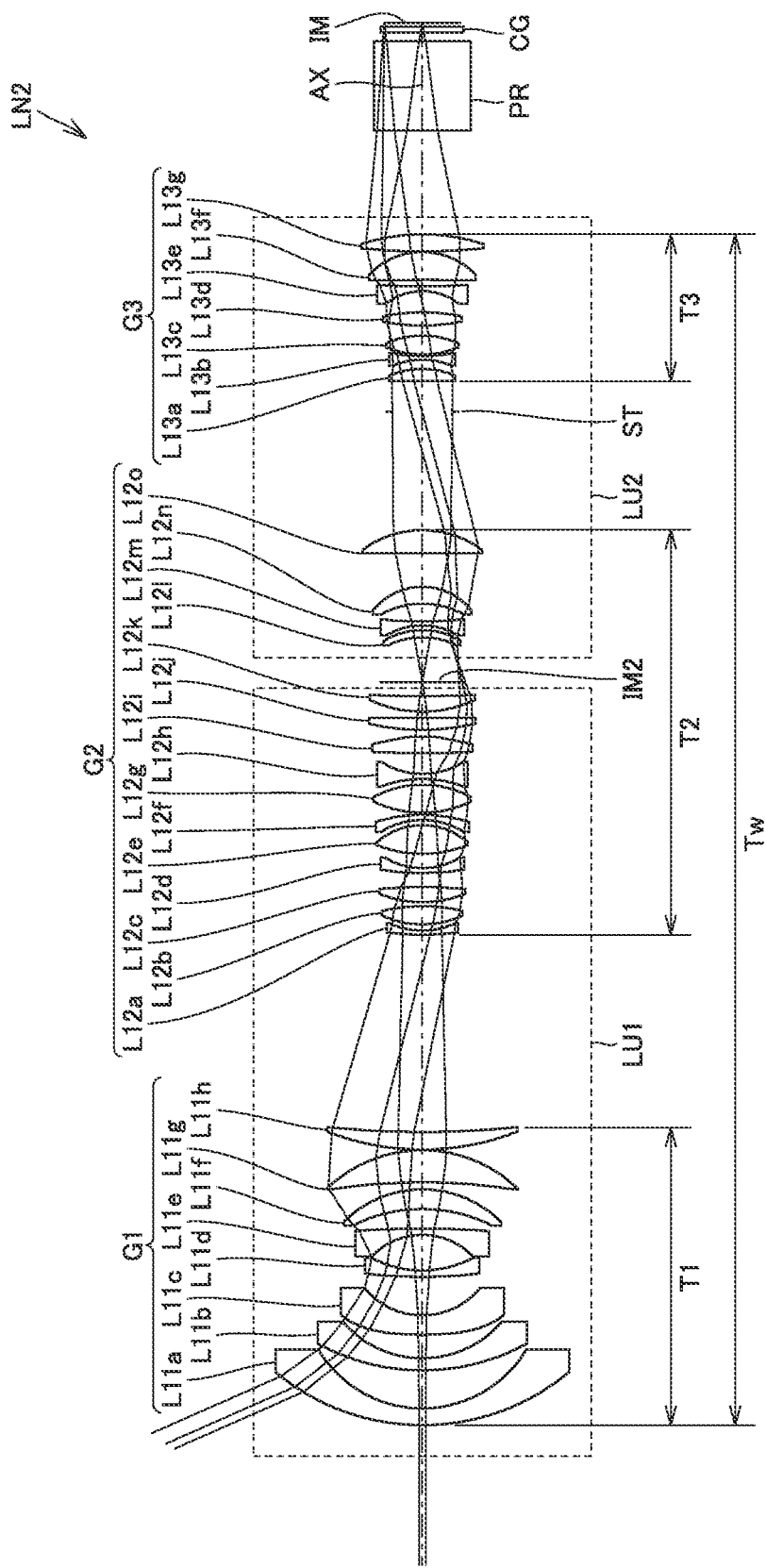
FIG. 4 is another developed view of the projection optical system according to one or more embodiments.

Projection optical system LN2 according to one or more embodiments will be described with reference to FIGS. 3 and 4. Projection optical system LN2 according to one or more embodiments has substantially the same configuration as projection optical system LN1, except mainly for the following:

In one or more embodiments of projection optical system LN2, prism PR guides an image of a single image display element 7 (see FIG. 26) to projection optical system LN2. Projection optical system LN2 is optimized, for example, for a single-plate projection apparatus.

Figure 5:
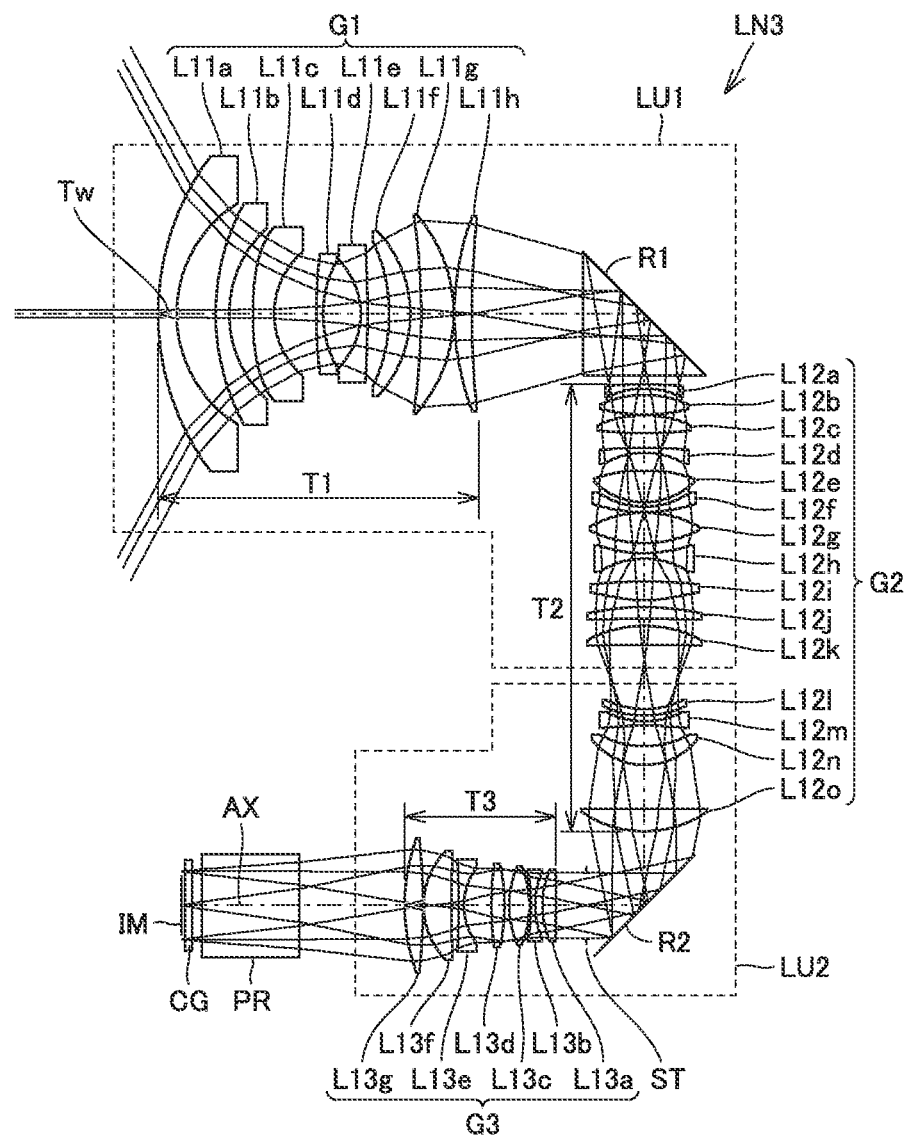
FIG. 5 shows another configuration of a projection optical system according to one or more embodiments.
Figure 6:
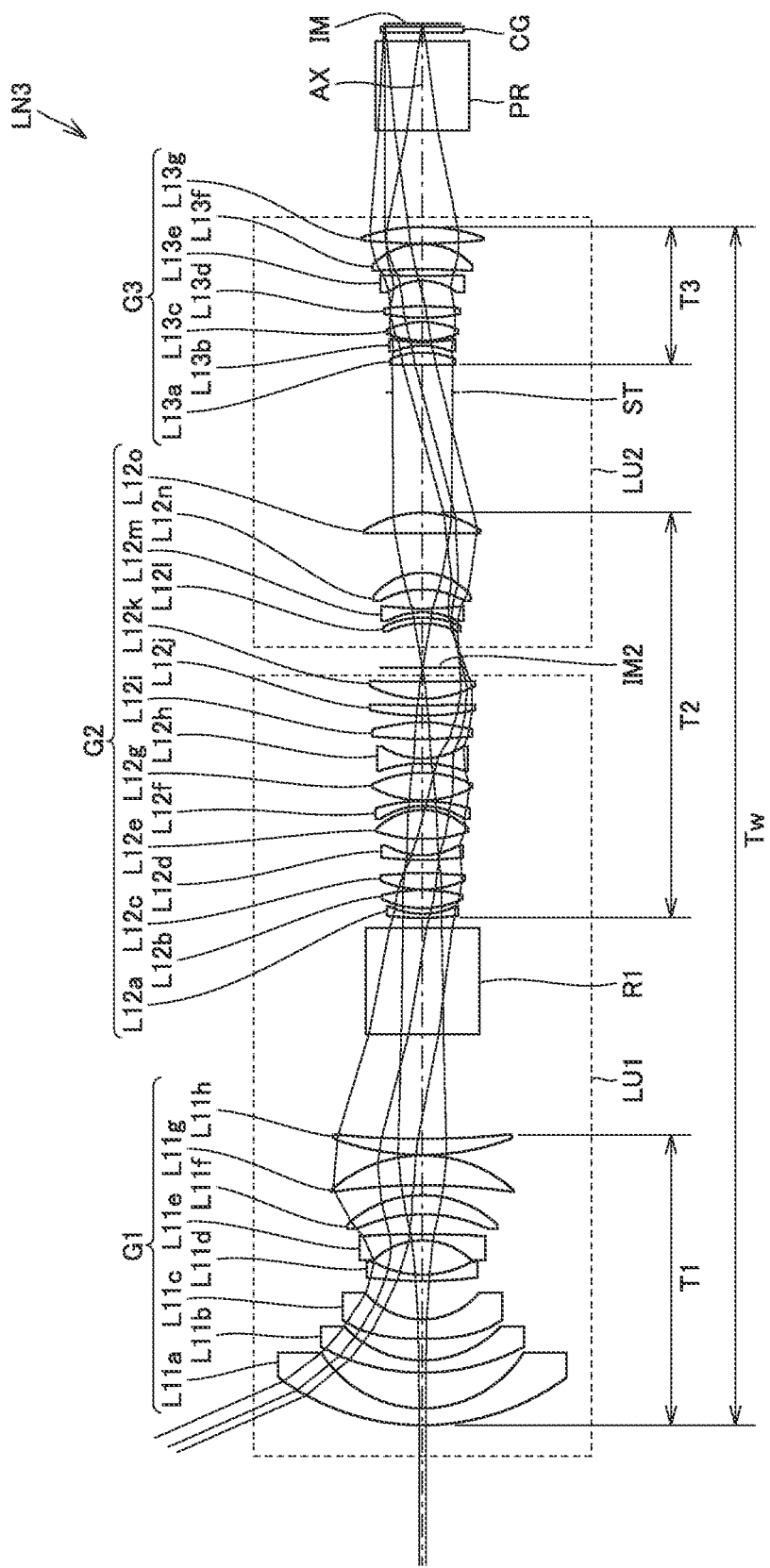
FIG. 6 is another developed view of the projection optical system according to one or more embodiments.

Projection optical system LN3 according to one or more embodiments will be described with reference to FIGS. 5 and 6. Projection optical system LN3 of one or more embodiments has substantially the same configuration as projection optical system LN2, except mainly for the following: In one or more embodiments of projection optical system LN3, first reflecting optical element R1 is a right-angle prism. The right-angle prism has an oblique side as a reflecting surface.

In modifications of one or more embodiments, second reflecting optical element R2 is also a right-angle prism, and the right-angle prism has an oblique side as a reflecting surface. In modifications of one or more embodiments, first reflecting optical element R1 is a plane mirror, and second reflecting optical element R2 is a right-angle prism.

Figure 7:
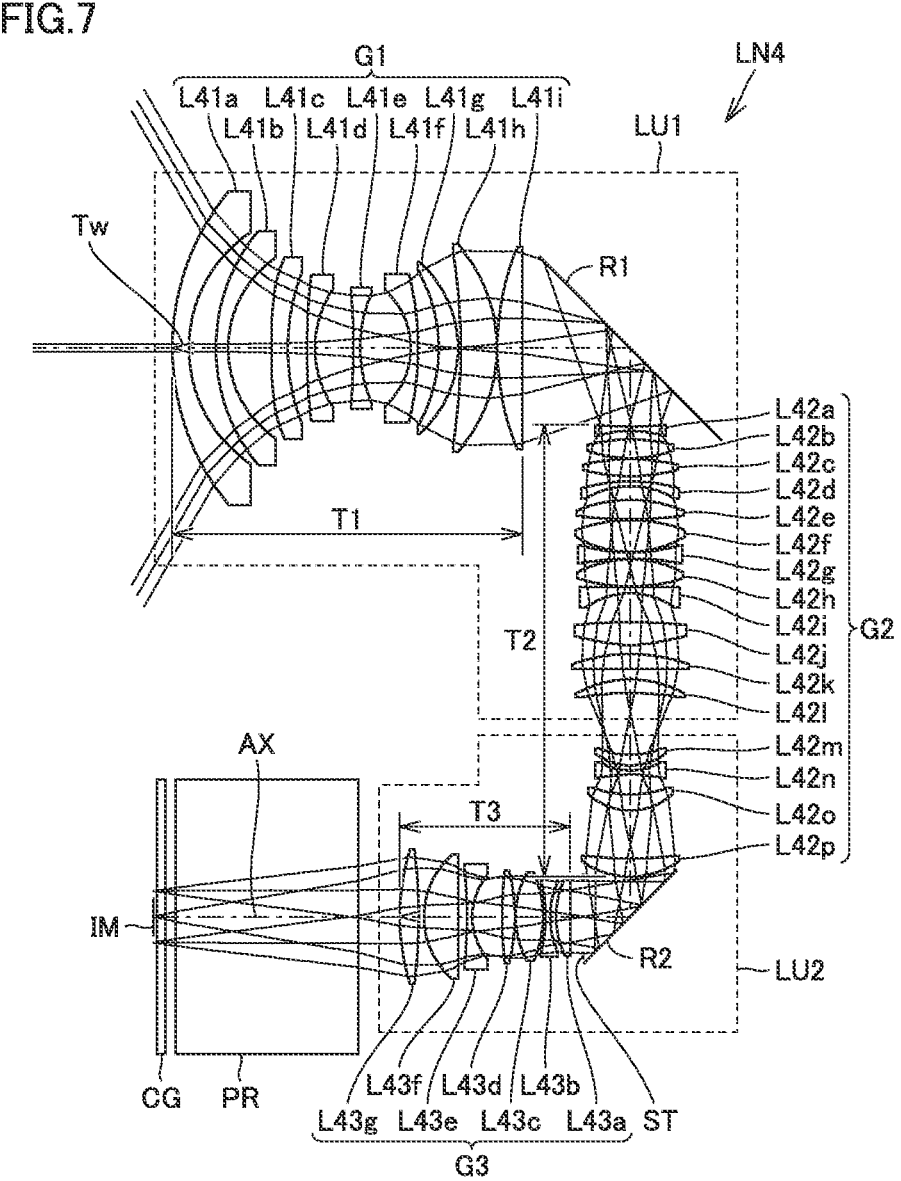
FIG. 7 shows another configuration of a projection optical system according to one or more embodiments.
Figure 8:
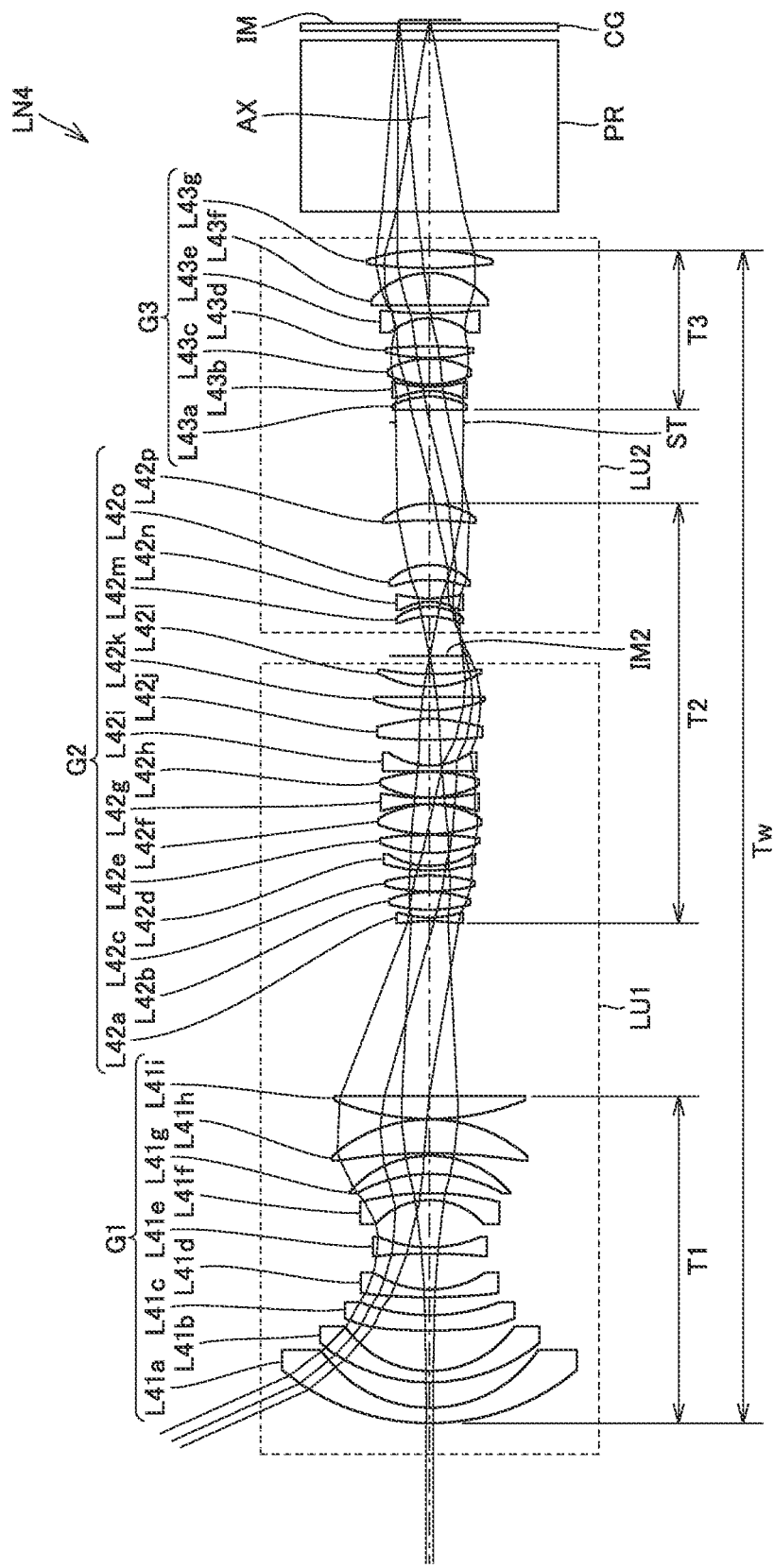
FIG. 8 is another developed view of the projection optical system according to one or more embodiments.

Projection optical system LN4 according to one or more embodiments will be described with reference to FIGS. 7 and 8. As well as projection optical system LN1, projection optical system LN4 according to one or more embodiments functions as a monofocal lens allowing projection at an angle of view of 100° or larger. Projection optical system LN4 according to one or more embodiments has substantially the same configuration as projection optical system LN1, except mainly for the following:

Projection optical system LN4 includes 32 lenses L41a to L41i, L42a to L42p, and L43a to L43g. First optical system LU1 includes 21 lenses L41a to L41i and L42a to L42l. Second optical system LU2 includes 11 lenses L42m to L42p and L43a to L43g.

First lens group G1 is composed of nine lenses L41a to L41i. First lens group G1 has a positive refractive power. Part of second lens group G2 included in first optical system LU1 is composed of 12 lenses L42a to L42l. The remainder of second lens group G2 included in second optical system LU2 is composed of four lenses L42m to L42p. Second lens group G2 is composed of 16 lenses L42a to L42p. Second lens group G2 has a positive refractive power. Third lens group G3 is composed of seven lenses L43a to L43g. Third lens group G3 has a positive refractive power.

In one or more embodiments, prism PR optically combines a plurality of images of the plurality of image display elements 7 and guides the optically combined images to projection optical system LN4. Projection optical system LN4 is optimized, for example, for a three-panel projection apparatus.

In modifications of one or more embodiments, focusing may be performed by moving some of the lenses of projection optical system LN4 along optical axis AX of projection optical system LN4. Specifically, focusing may be performed by moving five lenses L41e to L41i of first lens group G1 disposed closer to first reflecting optical element R1 along optical axis AX of projection optical system LN4. Alternatively, focusing may be performed by moving two lenses L42k and L42l of second lens group G2 that are disposed on the enlargement side of intermediate image IM2 along optical axis AX of projection optical system LN4 to vary a spacing between the two lenses L42k and L42l.

Figure 9:
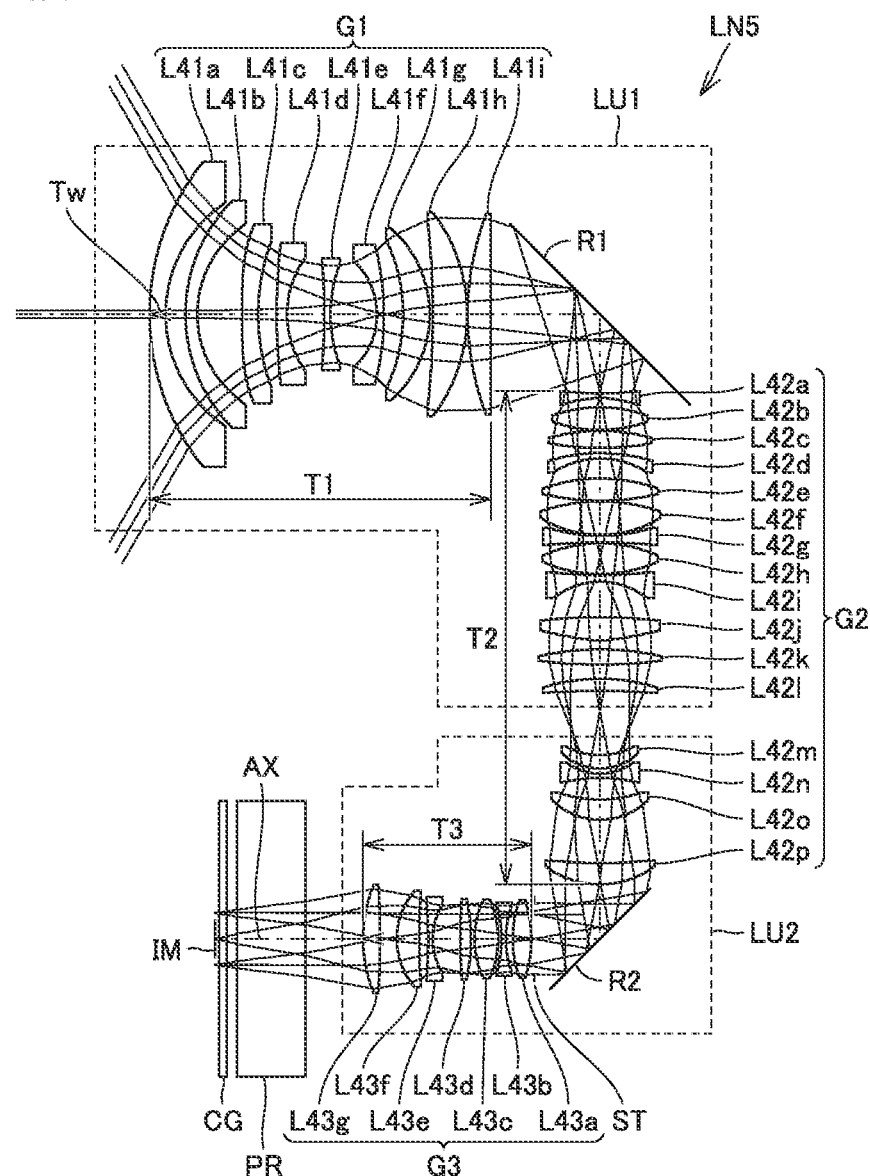
FIG. 9 shows another configuration of a projection optical system according to one or more embodiments.
Figure 10:
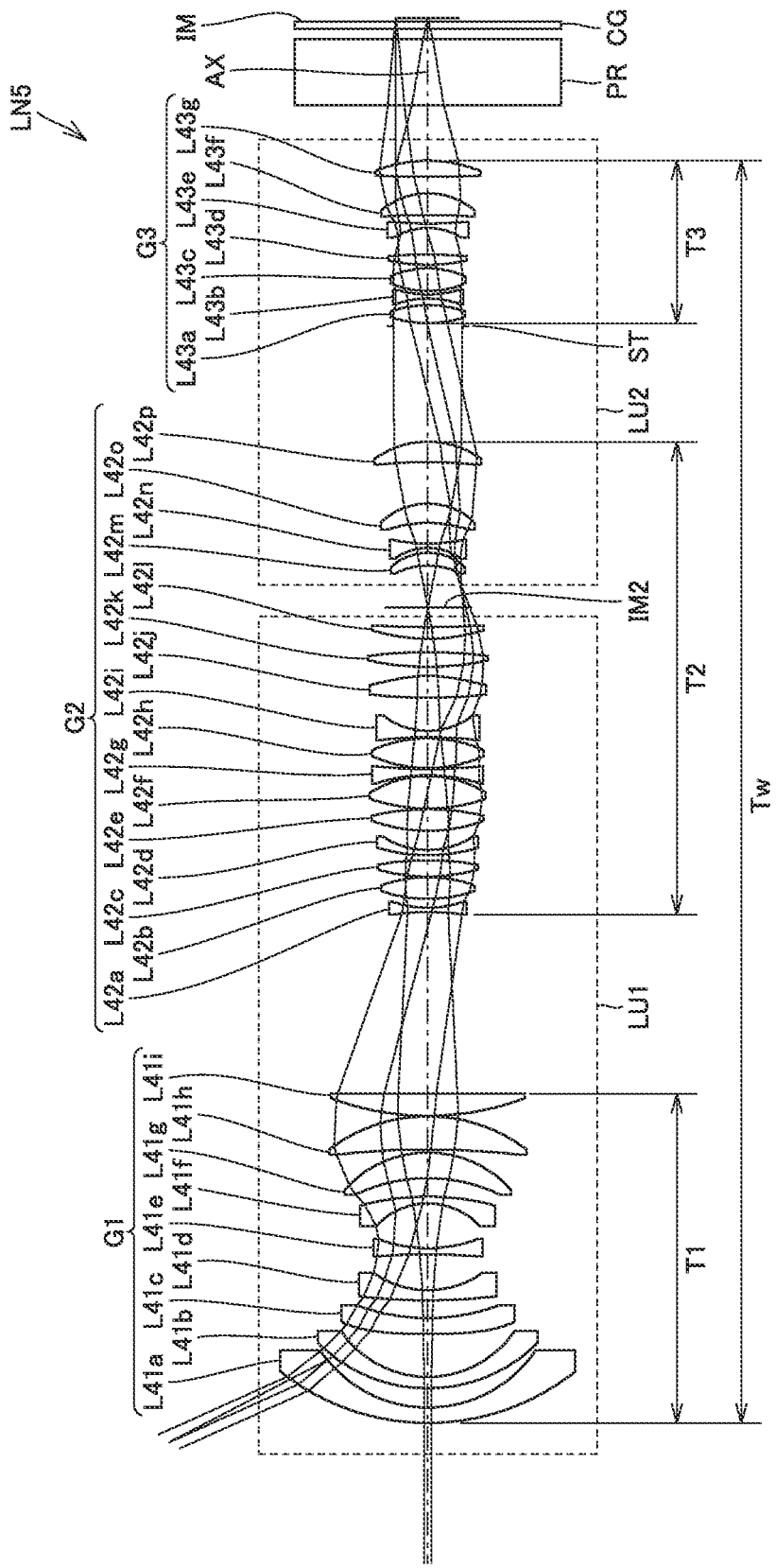
FIG. 10 is another developed view of the projection optical system according to one or more embodiments.

Projection optical system LN5 according to one or more embodiments will be described with reference to FIGS. 9 and 10. Projection optical system LN5 of one or more embodiments has substantially the same configuration as projection optical system LN4, except mainly for the following:

In one or more embodiments of projection optical system LN5, prism PR guides an image of a single image display element 7 to projection optical system LN5. Projection optical system LN5 is optimized for a single-plate projection apparatus.

Figure 11:
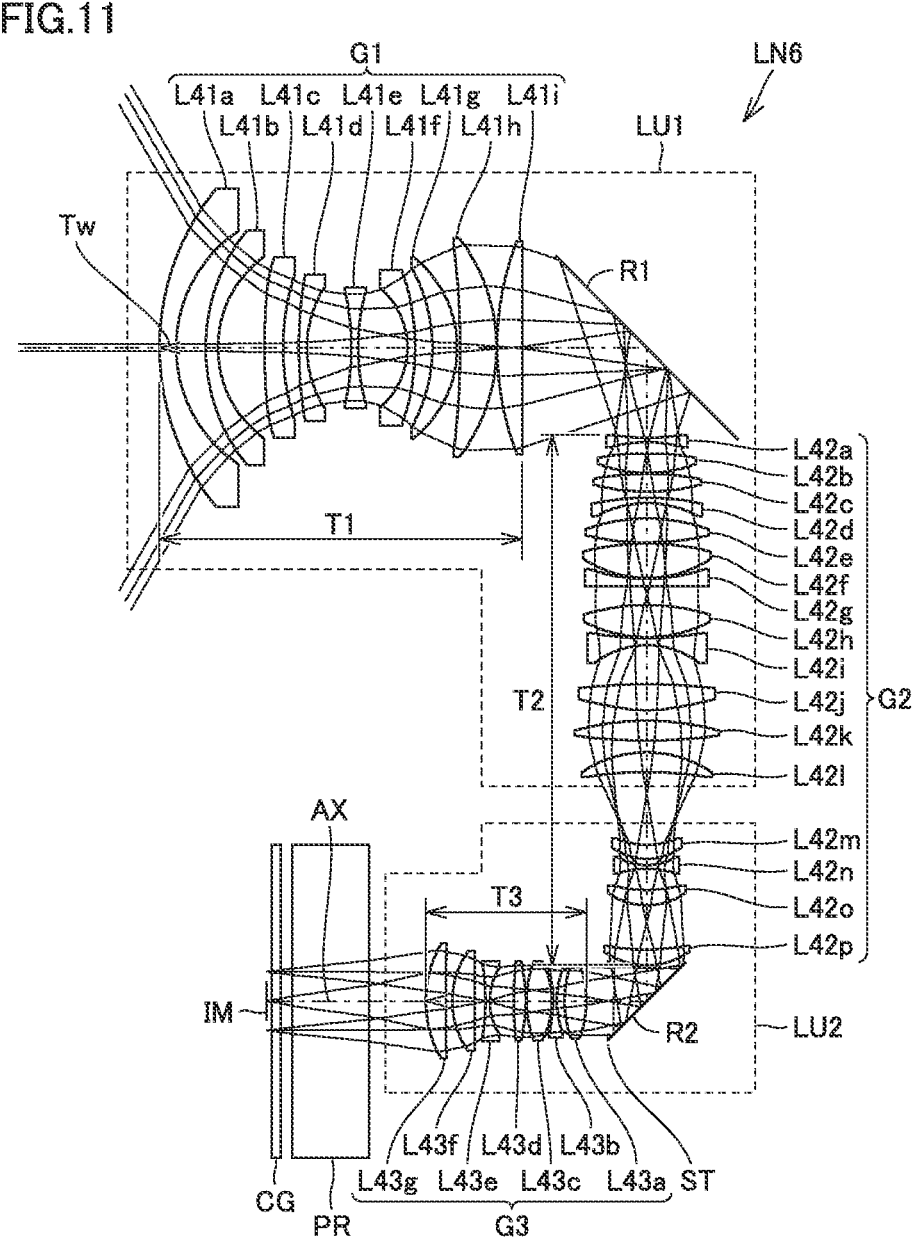
FIG. 11 shows another configuration of a projection optical system according to one or more embodiments.
Figure 12:
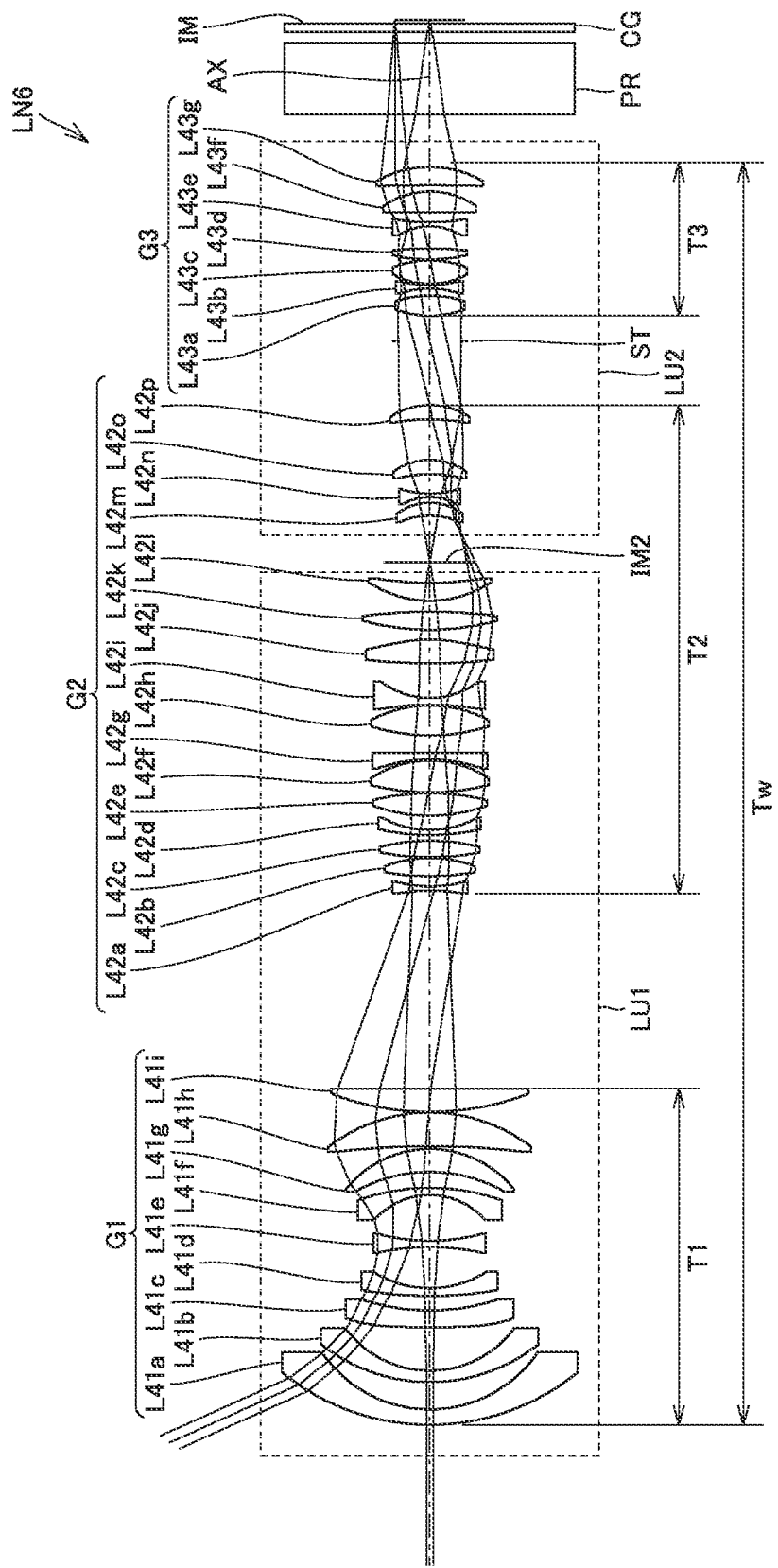
FIG. 12 is another developed view of the projection optical system according to one or more embodiments.

Projection optical system LN6 according to one or more embodiments will be described with reference to FIGS. 11 and 12. Projection optical system LN6 according to one or more embodiments has substantially the same configuration as projection optical system LN5, except for the brightness of projection optical system LN6.

Figure 13:
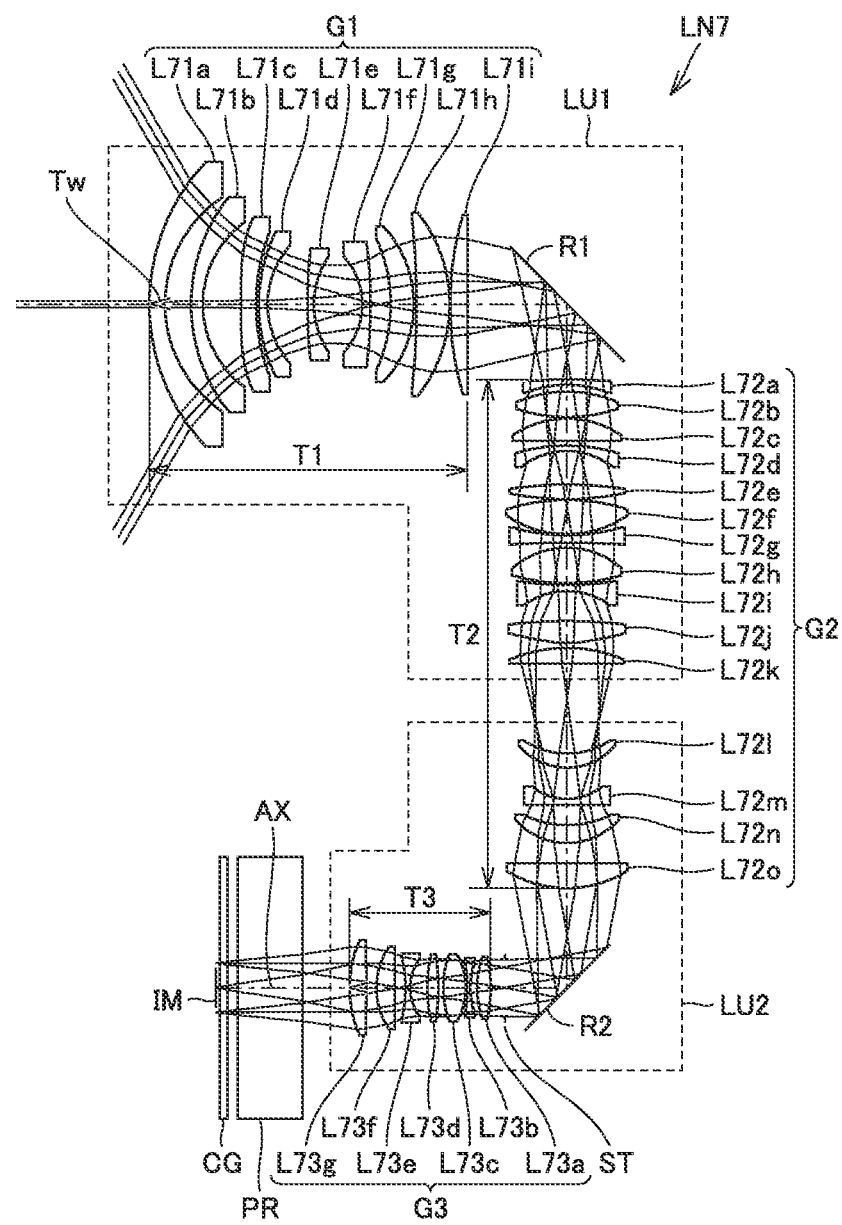
FIG. 13 shows another configuration of a projection optical system according to one or more embodiments.
Figure 14:
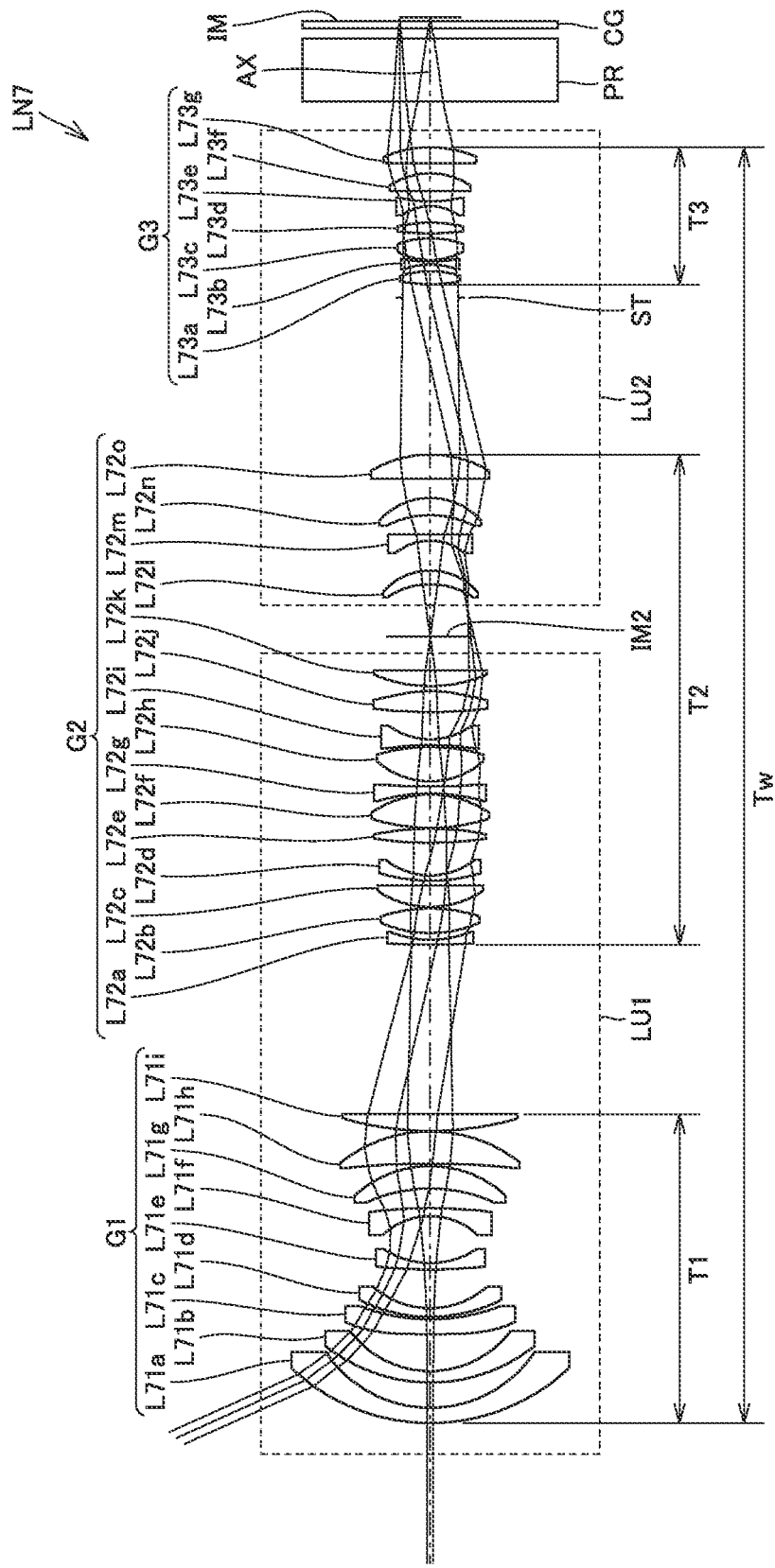
FIG. 14 is another developed view of the projection optical system according to one or more embodiments.

Projection optical system LN7 according to one or more embodiments will be described with reference to FIGS. 13 and 14. As well as projection optical system LN1, projection optical system LN7 according to one or more embodiments functions as a monofocal lens allowing projection at an angle of view of 100° or larger. Projection optical system LN7 according to one or more embodiments has substantially the same configuration as projection optical system LN1, except mainly for the following:

Projection optical system LN7 includes 31 lenses L71a to L71i, L72a to L72o, and L73a to L73g. First optical system LU1 includes 20 lenses L71a to L71i and L72a to L72k. Second optical system LU2 includes 11 lenses L72l to L72o and L73a to L73g.

First lens group G1 is composed of nine lenses L71a to L71i. First lens group G1 has a positive refractive power. Part of second lens group G2 included in first optical system LU1 is composed of 11 lenses L72a to L72k. The remainder of second lens group G2 included in second optical system LU2 is composed of four lenses L72l to L72o. Second lens group G2 is composed of 15 lenses L72a to L72o. Second lens group G2 has a positive refractive power. Third lens group G3 is composed of seven lenses L73a to L73g. Third lens group G3 has a positive refractive power.

In modifications of one or more embodiments, focusing may be performed by moving some of the lenses of projection optical system LN7 along optical axis AX of projection optical system LN7. Specifically, focusing may be performed by moving five lenses L71e to L71i of first lens group G1 disposed closer to first reflecting optical element R1 along optical axis AX of projection optical system LN7. Alternatively, focusing may be performed by moving lens L72k of second lens group G2 disposed on the enlargement side of intermediate image IM2 and a lens group of second lens group G2 composed of three lenses L72*h* to L72*j* adjacent to lens L72*k* and disposed on the enlargement side of lens L72*k* along optical axis AX of projection optical system LN7 to vary a spacing between lens L72*k* and lenses L72*h* to L72*j*.

Figure 15:
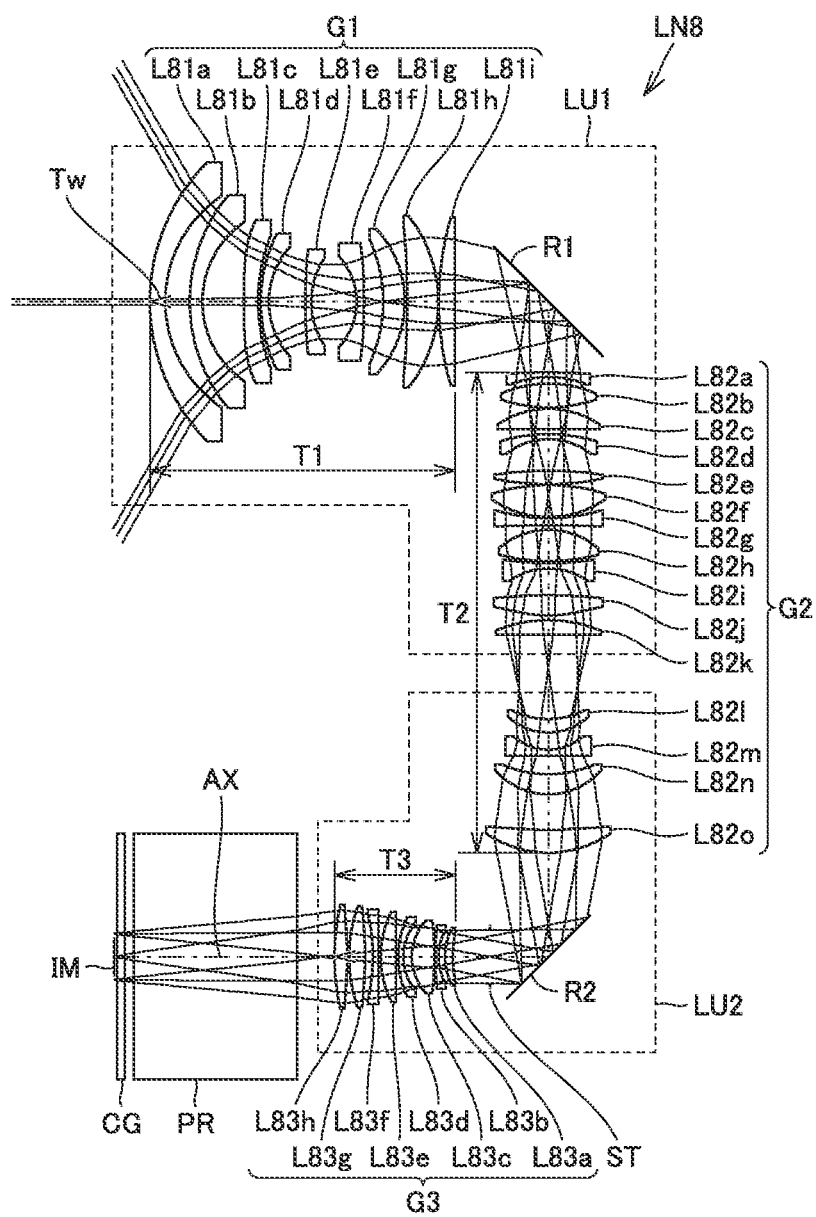
FIG. 15 shows another configuration of a projection optical system according to one or more embodiments.
Figure 16:
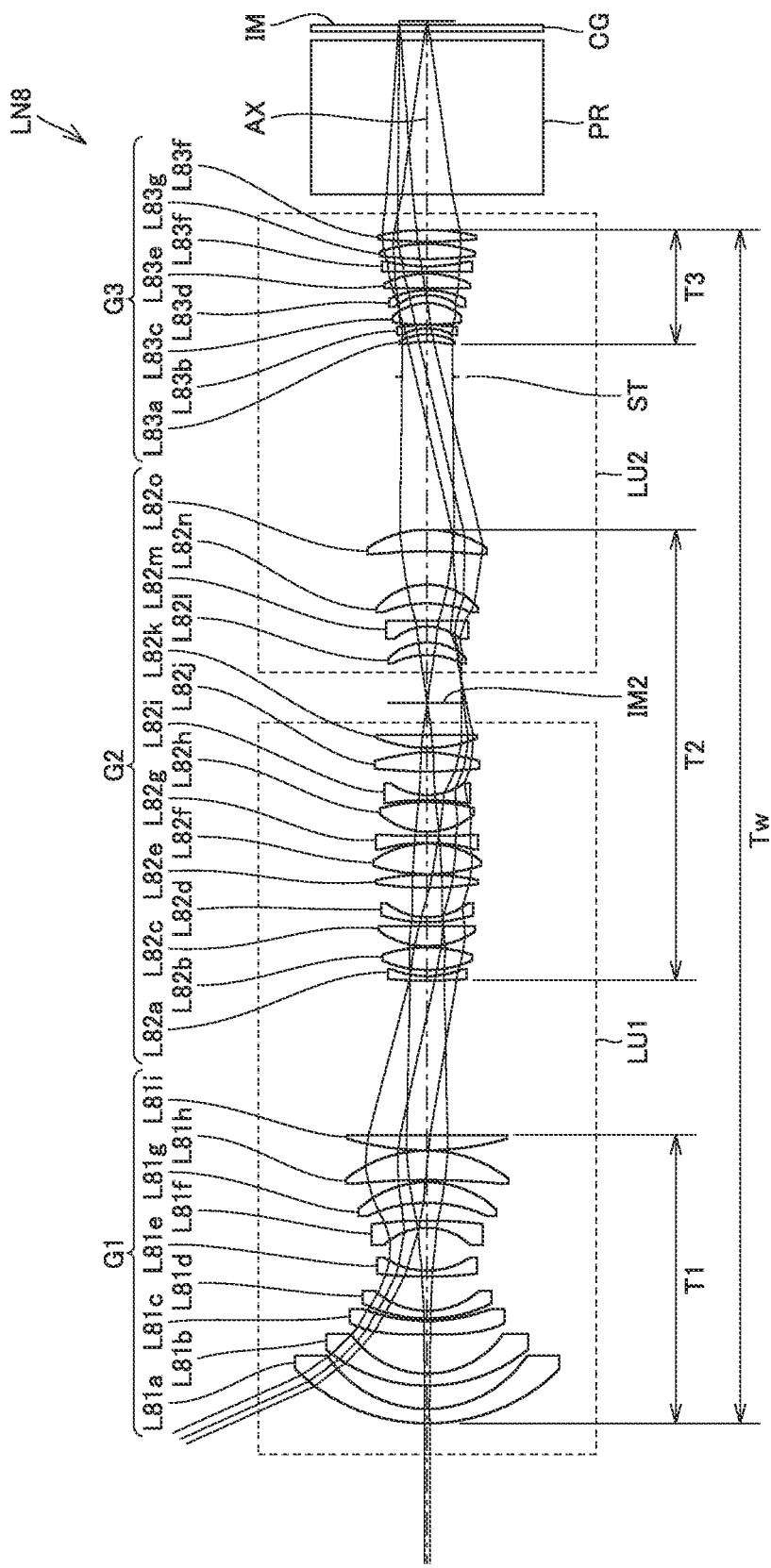
FIG. 16 is another developed view of the projection optical system according to one or more embodiments.
Figure 17:
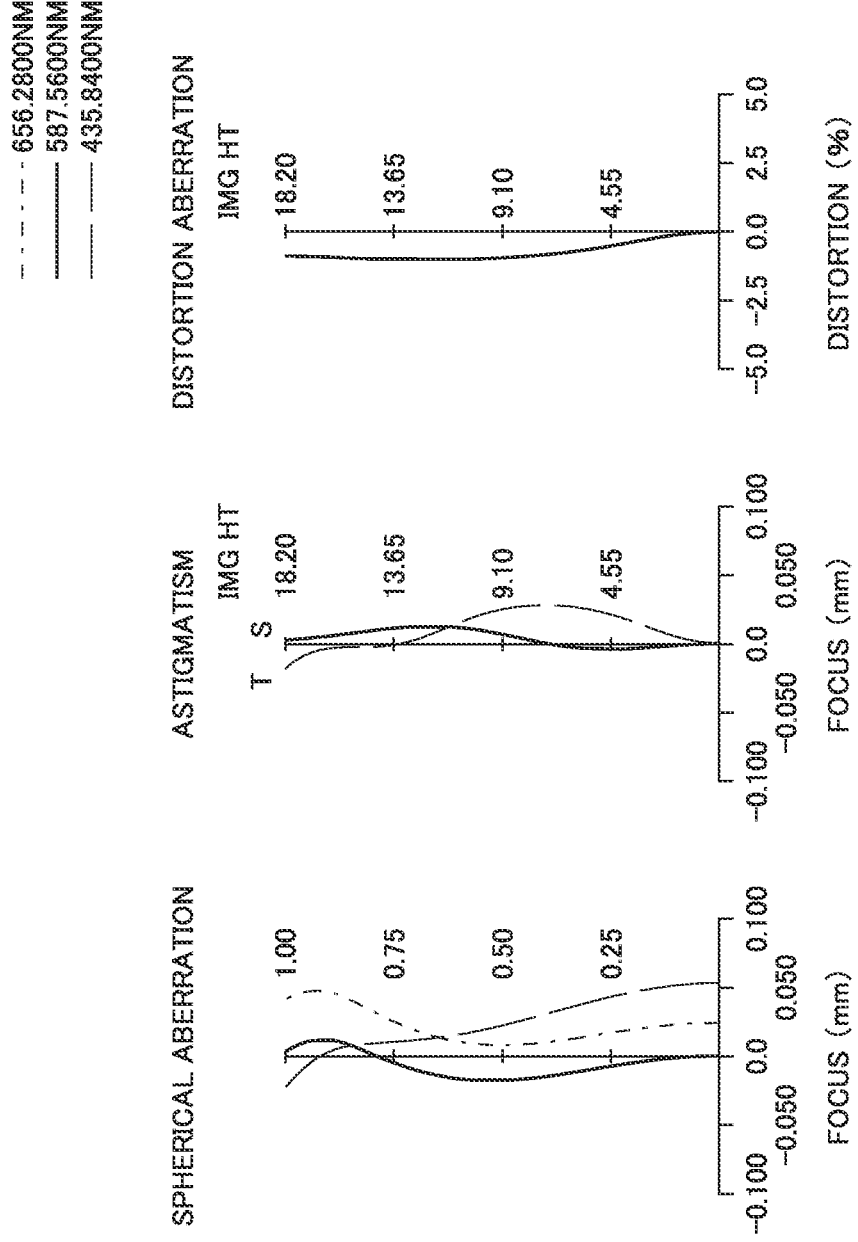
FIG. 17 is a longitudinal aberration diagram according to a first example.
Figure 18:
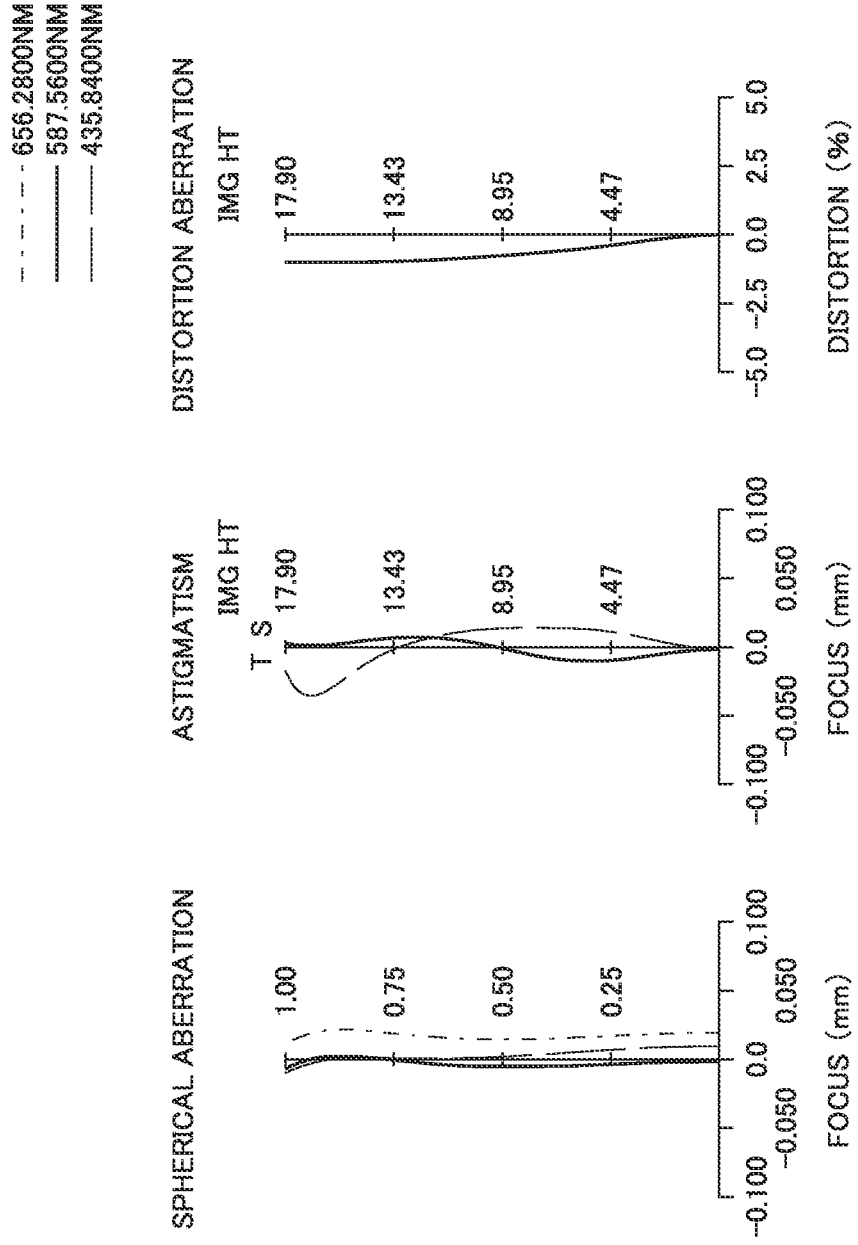
FIG. 18 is a longitudinal aberration diagram according to a second example.
Figure 19:
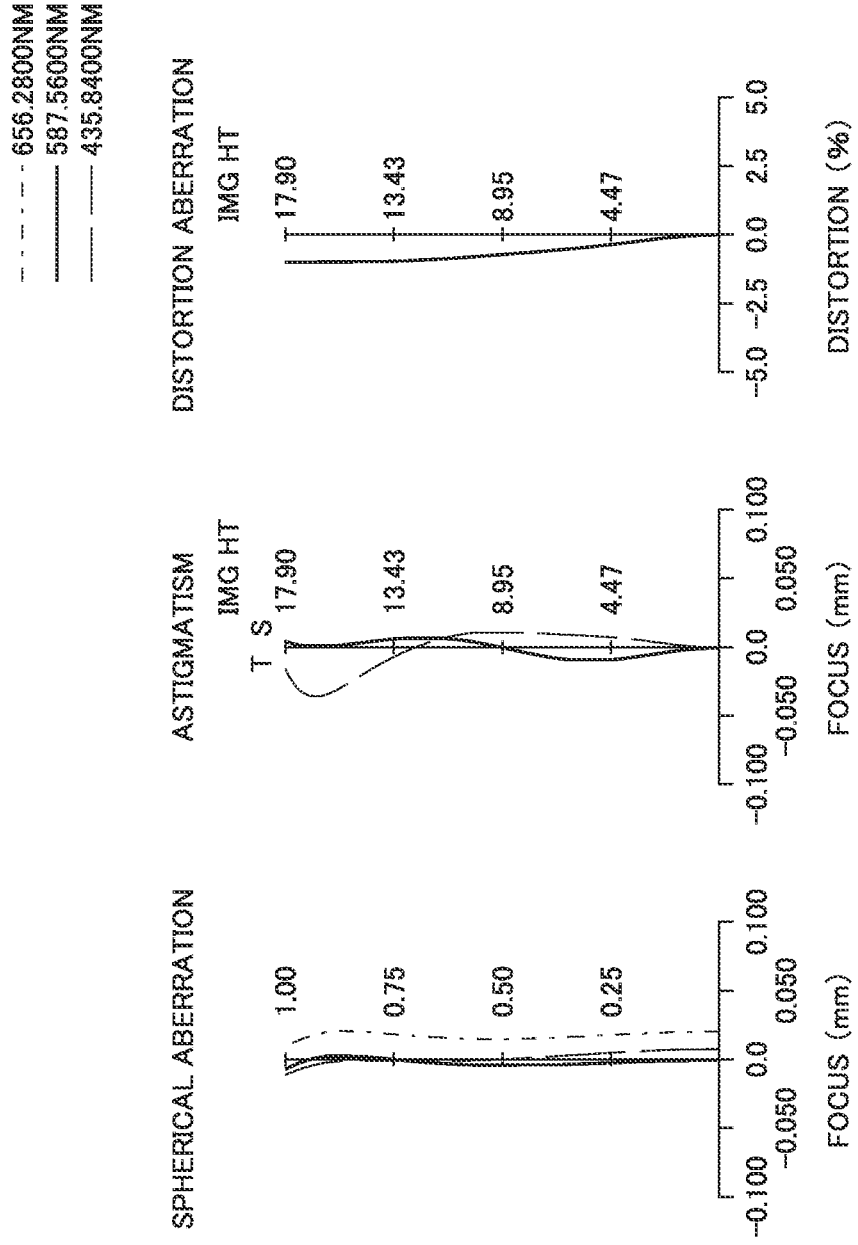
FIG. 19 is a longitudinal aberration diagram according to a third example.
Figure 20:
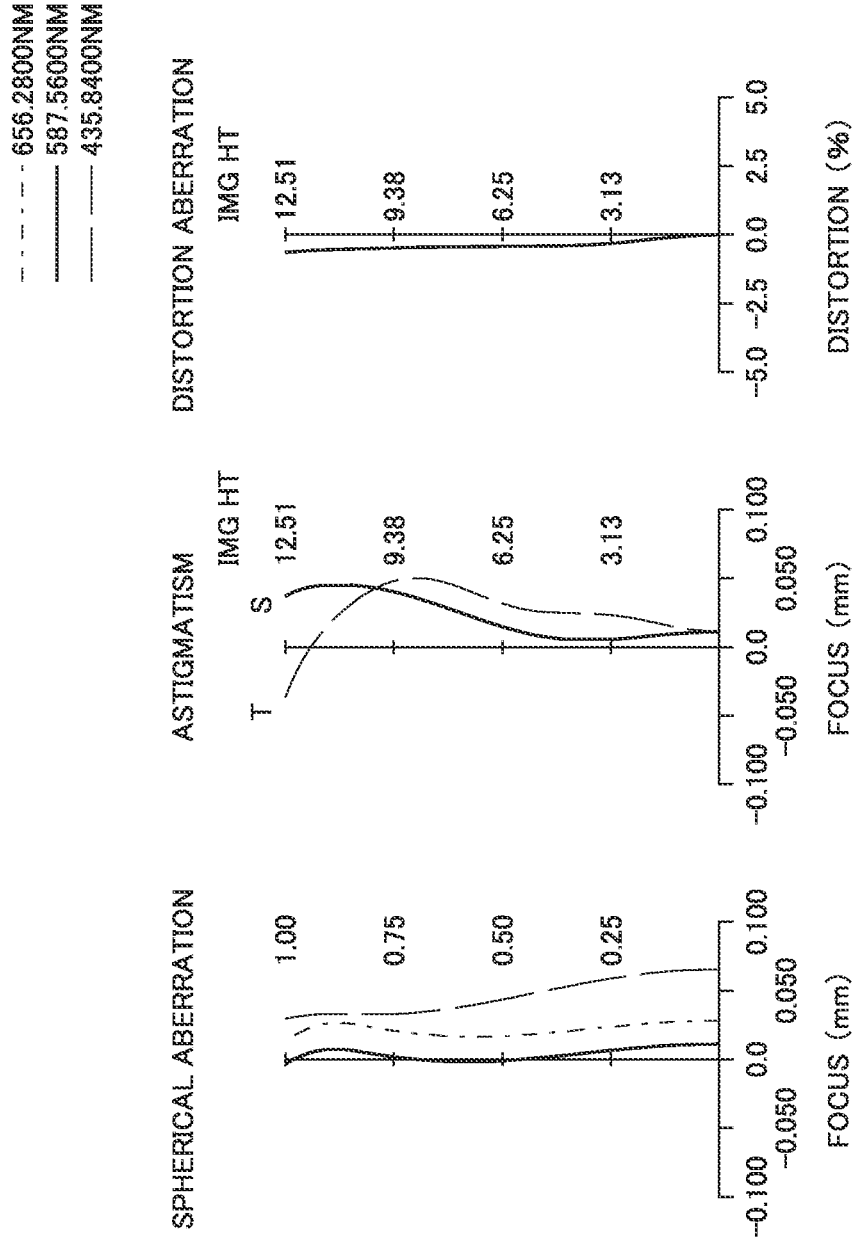
FIG. 20 is a longitudinal aberration diagram according to a fourth example.
Figure 21:
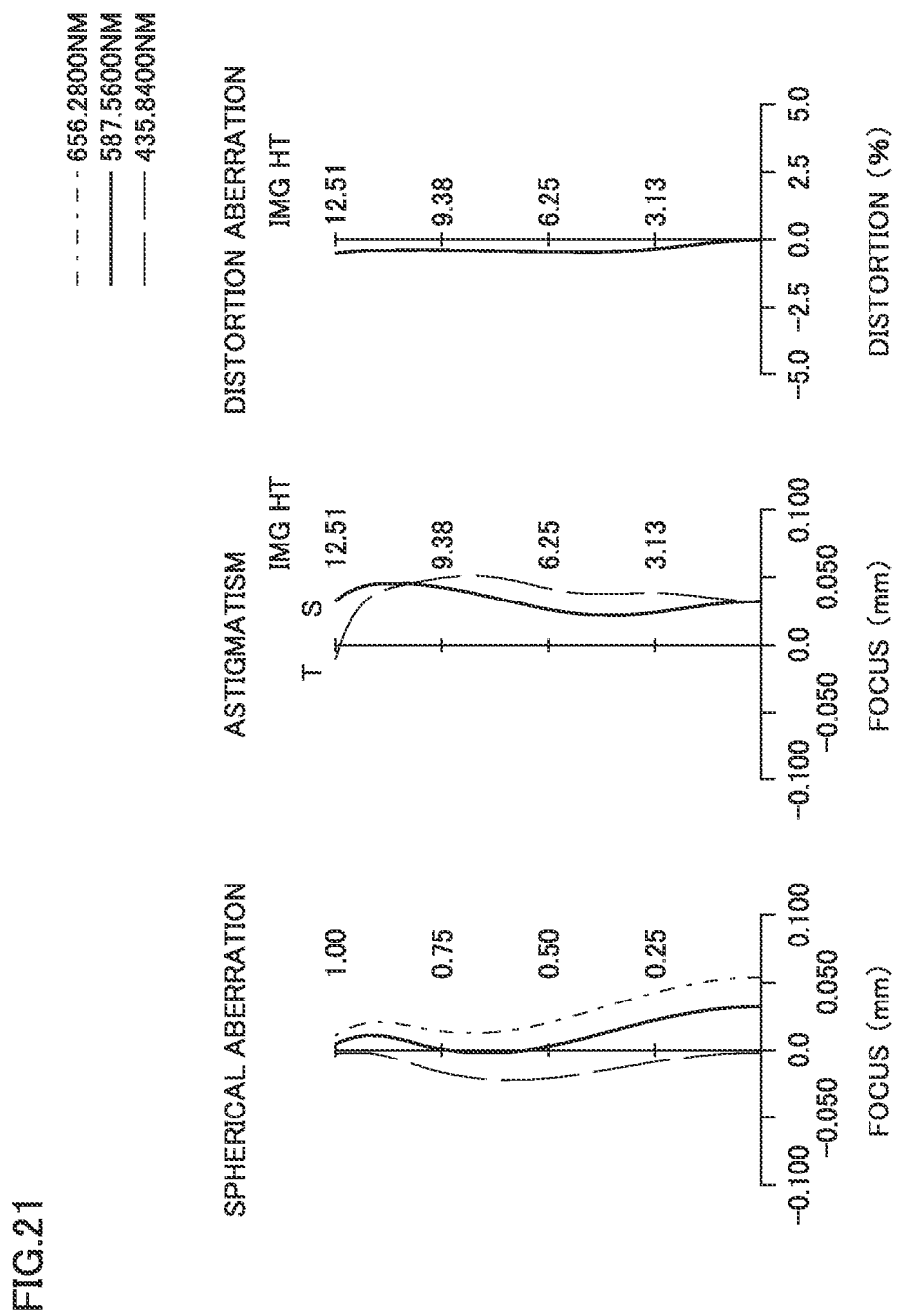
FIG. 21 is a longitudinal aberration diagram according to a fifth example.
Figure 22:
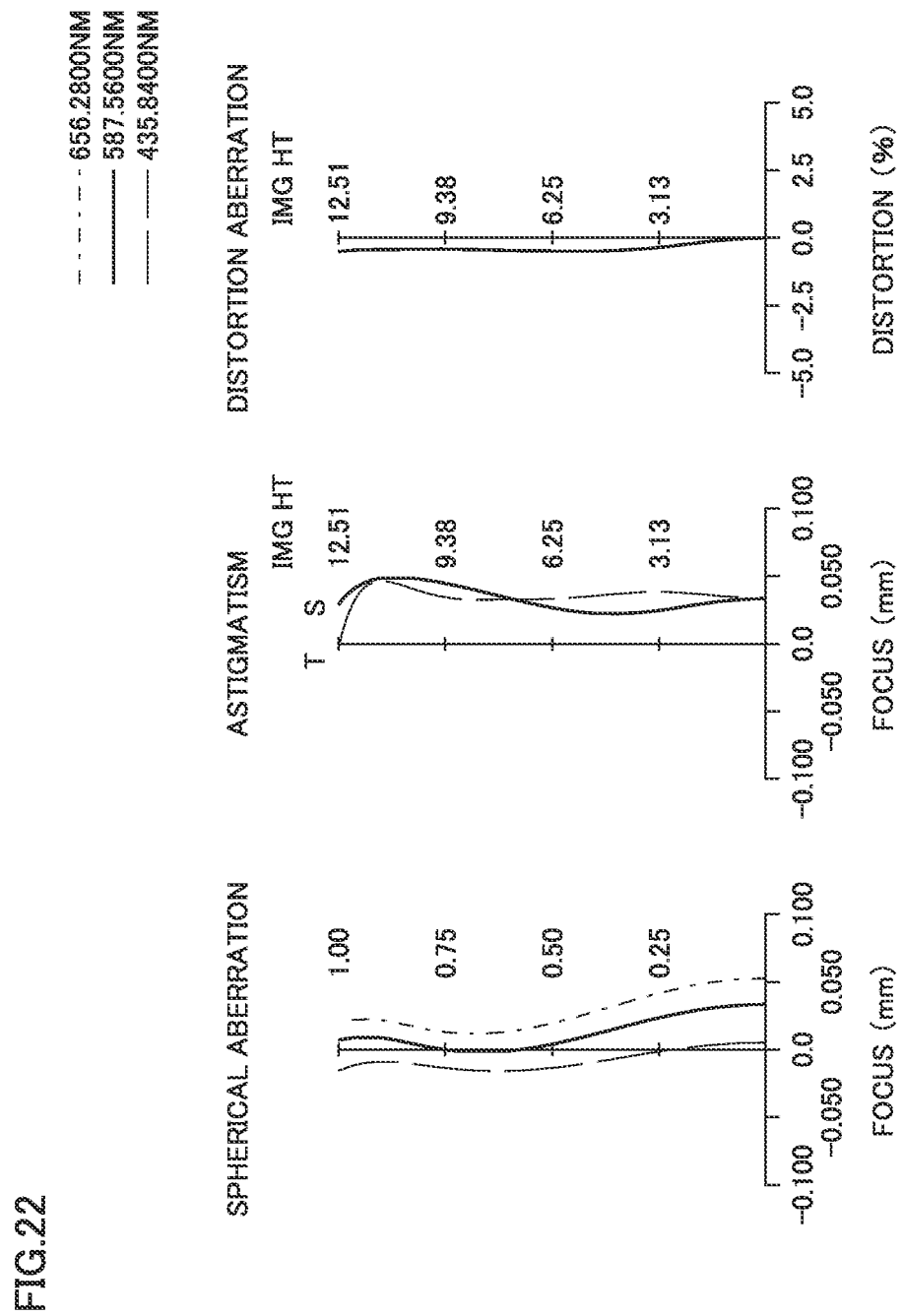
FIG. 22 is a longitudinal aberration diagram according to a sixth example.
Figure 23:
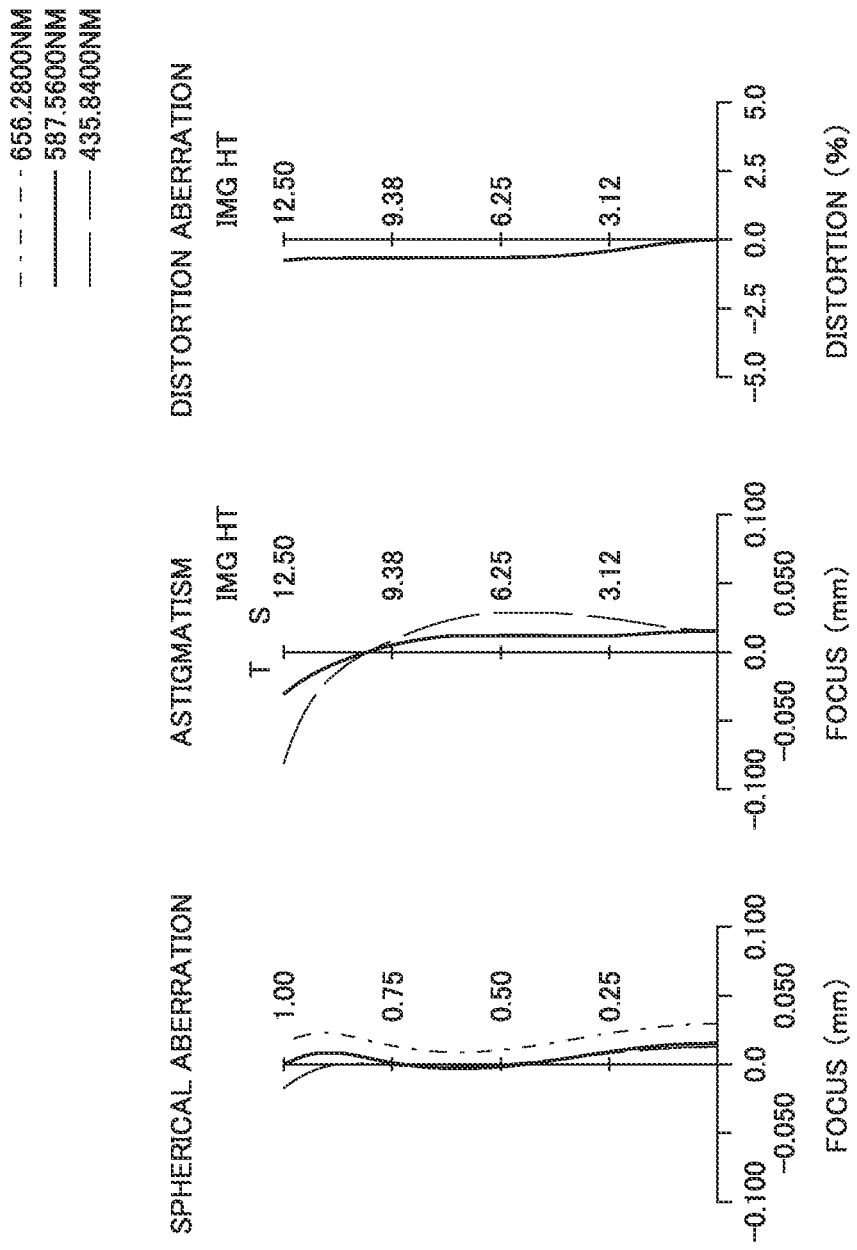
FIG. 23 is a longitudinal aberration diagram according to a seventh example.
Figure 24:
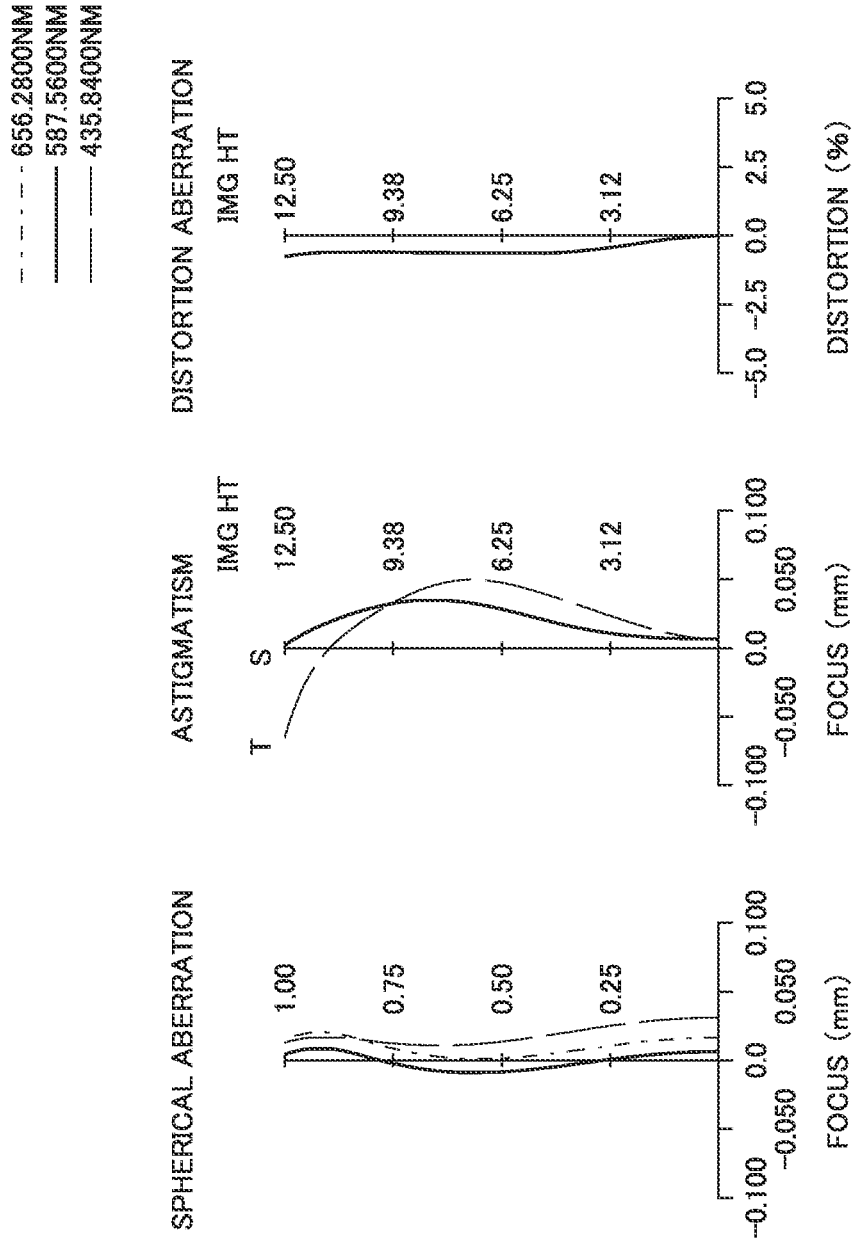
FIG. 24 is a longitudinal aberration diagram according to an eighth example.

Projection optical system LN8 according to one or more embodiments will be described with reference to FIGS. 15 and 16. As well as projection optical system LN7, projection optical system LN8 according to one or more embodiments functions as a monofocal lens allowing projection at an angle of view of 100° or larger. Projection optical system LN8 according to one or more embodiments has substantially the same configuration as projection optical system LN7, except for the following:

Projection optical system LN8 includes 32 lenses L81*a* to L81*i*, L82*a* to L82*o*, and L83*a* to L83*h*. First optical system LU1 includes 20 lenses L81*a* to L81*i* and L82*a* to L82*k*. Second optical system LU2 includes 12 lenses L82*l* to L82*o* and L83*a* to L83*h*.

First lens group G1 is composed of nine lenses L81*a* to L81*i*. First lens group G1 has a positive refractive power. Part of second lens group G2 included in first optical system LU1 is composed of 11 lenses L82*a* to L82*k*. The remainder of second lens group G2 included in second optical system LU2 is composed of four lenses L82*l* to L82*o*. Second lens group G2 is composed of 15 lenses L82*a* to L82*o*. Second lens group G2 has a positive refractive power. Third lens group G3 is composed of eight lenses L83*a* to L83*h*. Third lens group G3 has a positive refractive power.

In modifications of one or more embodiments, focusing may be performed by moving some of the lenses of projection optical system LN8 along optical axis AX of projection optical system LN8. Specifically, focusing may be performed by moving five lenses L81*e* to L81*i* of first lens group G1 disposed closer to first reflecting optical element R1 along optical axis AX of projection optical system LN8. Alternatively, focusing may be performed by moving lens L82*k* of second lens group G2 disposed on the enlargement side of intermediate image IM2 and a lens group of second lens group G2 composed of three lenses L82*h* to L82*j* adjacent to lens L82*k* and disposed on the enlargement side of lens L82*k* along optical axis AX of projection optical system LN8 to vary a spacing between lens L82*k* and lenses L82*h* to L82*j*.

EXAMPLES

Hereinafter, the configurations and the like of projection optical systems LN1 to LN8 according to one or more embodiments will be described more specifically with reference to construction data of examples. Examples 1 to 8 described herein are numerical examples respectively corresponding to the embodiments described above. The configuration diagrams (see FIGS. 1 to 16) of projection optical systems LN1 to LN8 representing the embodiments show the optical configurations (lens arrangement, lens shape, etc.) of Examples 1 to 8 corresponding thereto, respectively.

In the construction data of each Example, as surface data, from the left column, a surface number i, a radius of curvature r (mm) in a paraxial position, an on-axis surface interval d (mm), a refractive index nd for d line (wavelength: 587.56 nm), and an Abbe number vd for d line are listed. Note that SC denotes a screen surface, ST denotes an aperture stop, and IM denotes an image display surface.

A Surface having a surface number i with * attached is an aspheric surface, and the surface has a surface shape defined by the following formula (AS) using a local orthogonal coordinate system (x, y, z) having a surface vertex as the origin. As aspherical data, aspherical coefficients and the like are listed. Note that, with respect to the aspherical data of each Example, the coefficients of the terms having no marks are 0, and e-n=×10$^{-n}$ for all the data.

$$z=(c \cdot h^2)/[1+\sqrt{\{1-(1+K) \cdot c^2 \cdot h^2\}}]+\Sigma(Aj \cdot hj) \tag{AS}$$

where h represents a height ($h^2=x^2+y^2$) in a direction perpendicular to the z axis (optical axis AX), z represents a Sag amount in the direction of the optical axis AX (with reference to a vertex of the surface) at the position of the height h, c represents a curvature at the vertex of the surface (a reciprocal of radius of curvature r), K represents a conical constant, and Aj represents a j-th order aspherical coefficient.

As various data of Examples 1 to 8, focal lengths (Fl, mm) of the entire system, F numbers (Fno), half angle of view (ω, °), image heights (ymax, mm), total lens lengths (TL, mm), and back focuses (BF, mm) are listed. Note that, with respect to the back focuses BF, the distance from the last lens surface to the paraxial image surface is expressed by an air conversion length, and the total length TL of the lens is obtained by adding the back focus BF to the distance Tw from the foremost lens surface (the surface of first lens group G1 closest to the enlargement side) to the last lens surface (the surface of third lens group G3 closest to the reduction side). The image height ymax corresponds to a half of the diagonal length of the image display surface IM.

Tables 1 and 2 indicate values corresponding to conditional formulae, data relevant thereto, and the like for each Example. The data relevant thereto includes, for example, a distance T1 on optical axis AX from a surface of first lens group G1 closest to the enlargement side to a surface of first lens group G1 closest to the reduction side, a distance T2 on optical axis AX from a surface of second lens group G2 closest to the enlargement side to a surface of second lens group G2 closest to the reduction side, a distance T3 on optical axis AX from a surface of third lens group G3 closest to the enlargement side to a surface of third lens group G3 closest to the reduction side, and a distance Tw on optical axis AX from a surface of projection optical systems LN1 to LN8 closest to the enlargement side to a surface of projection optical systems LN1 to LN8 closest to the reduction side.

FIGS. 17 to 24 are aberration diagrams (longitudinal aberration diagrams in the infinity in-focus state) of Examples 1 to 8. Note that in a case where projection optical systems LN1 to LN8 according to the embodiments described above are used as a projection apparatus 1 (see FIG. 25), originally, the screen surface (a projection receiving surface) SC is an image surface, and the image display surface IM is an object plane. However, one or more embodiments are configured as a reduction system in terms of optical design, and the screen surface SC is assumed to be an object surface (object), and optical performance is evaluated with an image display surface (an image surface on the reduction side) IM corresponding to the image surface (image).

In the spherical aberration diagram, an amount of spherical aberration for a wavelength of 656.28 nm, as indicated by a one-dot dashed line, an amount of spherical aberration for a wavelength of 587.56 nm (d line), as indicated by a solid line, and an amount of spherical aberration for a wavelength of 435.84 nm, as indicated by a broken line, are represented by the respective amounts of shift (unit: mm) in the direction of the optical axis AX from the paraxial image surface. In the spherical aberration diagram, the vertical axis represents values (that is, relative pupil heights) obtained by normalizing incident heights on the pupil by the maximum height.

In the astigmatism diagram, the broken line T represents a tangential image surface with respect to the d line, the solid line S represents a sagittal image surface with respect to the d line in terms of a shift amount (unit: mm) in the direction of the optical axis AX from the paraxial image surface. In the astigmatism diagram, the vertical axis represents an image height (IMG HT, unit: mm).

In the distortion aberration diagram, the horizontal axis represents distortion (unit: %) with respect to the d line, and the vertical axis represents an image height (IMG HT, unit: mm).

Example 1

| unit: mm | | | | |
|---|---|---|---|---|
| surface data | | | | |
| i | r | d | nd | vd |
| object (SC) | infinity | | | |
| 1 | 109.698 | 7.900 | 1.70154 | 41.15 |
| 2 | 61.030 | 14.299 | | |
| 3 | 91.565 | 5.700 | 1.83400 | 37.34 |
| 4 | 44.599 | 13.666 | | |
| 5* | 196.663 | 9.000 | 1.83404 | 37.30 |
| 6 | 36.730 | 17.558 | | |
| 7 | 1838.837 | 2.900 | 1.83400 | 37.34 |
| 8 | 47.583 | 19.622 | | |
| 9 | −32.401 | 3.072 | 1.84666 | 23.78 |
| 10 | −156.892 | 9.242 | | |
| 11 | −62.372 | 9.315 | 1.91082 | 35.25 |
| 12 | −48.824 | 0.906 | | |
| 13 | −288.294 | 14.391 | 1.90366 | 31.31 |
| 14 | −66.401 | 0.300 | | |
| 15 | 152.790 | 8.276 | 1.83400 | 37.34 |
| 16 | −6537.371 | 89.355 | | |
| 17 | 233.605 | 1.800 | 1.60342 | 38.01 |
| 18 | 38.868 | 3.335 | | |
| 19 | 52.111 | 8.118 | 1.43700 | 95.10 |
| 20 | −69.839 | 0.300 | | |
| 21 | 51.737 | 7.188 | 1.43700 | 95.10 |
| 22 | −243.261 | 6.569 | | |
| 23 | 82.783 | 2.250 | 1.80610 | 33.27 |
| 24 | 32.396 | 6.004 | | |
| 25 | 52.239 | 13.497 | 1.43700 | 95.10 |
| 26 | −34.244 | 0.857 | | |
| 27 | −43.807 | 2.362 | 1.80610 | 33.27 |
| 28 | −122.040 | 0.420 | | |
| 29 | 51.567 | 13.234 | 1.43700 | 95.10 |
| 30 | −40.913 | 1.110 | | |
| 31 | −47.554 | 2.400 | 1.62004 | 36.30 |
| 32 | 32.482 | 10.738 | | |
| 33 | 192.809 | 8.668 | 1.80835 | 40.55 |
| 34* | −43.925 | 3.000 | | |
| 35 | 100.842 | 6.287 | 1.85478 | 24.80 |
| 36 | −439.033 | 3.000 | | |
| 37 | 55.708 | 5.892 | 1.80518 | 25.46 |
| 38 | 140.133 | 7.705 | | |
| 39 | infinity | 20.956 | | |
| 40 | −33.974 | 4.450 | 1.51680 | 64.20 |
| 41 | −26.460 | 2.522 | | |
| 42 | −25.345 | 1.919 | 1.80610 | 33.27 |
| 43 | 183.258 | 8.834 | | |
| 44 | −42.566 | 7.117 | 1.91082 | 35.25 |
| 45 | −28.781 | 11.957 | | |
| 46 | −3609.037 | 10.223 | 1.58913 | 61.25 |
| 47 | −43.329 | 53.745 | | |
| 48(ST) | infinity | 13.131 | | |
| 49 | −3412.862 | 5.486 | 1.43700 | 95.10 |
| 50 | −43.675 | 10.473 | | |
| 51 | −30.545 | 1.800 | 1.80610 | 33.27 |
| 52 | 88.741 | 1.476 | | |
| 53 | 53.111 | 9.372 | 1.43700 | 95.10 |
| 54 | −37.425 | 0.300 | | |
| 55 | 105.046 | 6.841 | 1.59282 | 68.62 |
| 56 | −63.988 | 11.962 | | |
| 57 | −27.909 | 2.209 | 1.80610 | 40.73 |
| 58 | 222.994 | 3.083 | | |
| 59 | 2089.083 | 13.626 | 1.55032 | 75.50 |
| 60 | −34.707 | 0.631 | | |
| 61 | −1793.687 | 8.102 | 1.80518 | 25.46 |
| 62 | −69.645 | 16.055 | | |
| 63 | infinity | 85.000 | 1.51680 | 64.20 |
| 64 | infinity | 4.000 | | |
| 65 | infinity | 3.000 | 1.48749 | 70.44 |
| 66 | infinity | 1.500 | | |
| image(IM) | infinity | | | |

| aspherical data | | | | |
|---|---|---|---|---|
| i | K | A4 | A6 | A8 |
| 5 | 5.0114e+000 | 3.0828e−006 | −1.0990e−009 | 4.9092e−013 |
| i | A10 | A12 | A14 | A16 |
| 5 | −3.2583e−017 | 0.0000e+000 | | |

| aspherical data | | | | |
|---|---|---|---|---|
| i | K | A4 | A6 | A8 |
| 34 | 0.0000e+000 | 1.8733e−005 | −2.9859e−008 | 4.1452e−011 |
| i | A10 | A12 | A14 | A16 |
| 34 | −4.0688e−014 | 1.7008e−017 | 0.0000e+000 | |

| various data | |
|---|---|
| Fl | −7.968 |
| Fno. | 2.500 |
| ω | 66.356 |
| ymax | 18.200 |
| TL | 630.056 |
| BF | 79.611 |

Example 2

| unit: mm | | | | |
|---|---|---|---|---|
| surface data | | | | |
| i | r | d | nd | vd |
| object (SC) | infinity | infinity | | |
| 1 | 106.261 | 7.900 | 1.70154 | 41.15 |
| 2 | 56.346 | 17.899 | | |
| 3 | 100.814 | 5.700 | 1.83400 | 37.34 |
| 4 | 48.795 | 11.064 | | |
| 5* | 190.657 | 9.100 | 1.83404 | 37.30 |
| 6 | 34.432 | 18.161 | | |
| 7 | 232.875 | 3.000 | 1.83400 | 37.34 |
| 8 | 49.922 | 16.701 | | |
| 9 | −32.566 | 3.000 | 1.84666 | 23.78 |
| 10 | −407.042 | 9.245 | | |
| 11 | −70.834 | 9.185 | 1.91082 | 35.25 |
| 12 | −51.628 | 3.330 | | |
| 13 | −280.688 | 15.122 | 1.90366 | 31.31 |
| 14 | −63.782 | 0.300 | | |
| 15 | 119.959 | 8.300 | 1.83400 | 37.34 |
| 16 | 424.806 | 92.904 | | |

-continued unit: mm

| | | | | |
|---|---|---|---|---|
| 17 | 145.365 | 1.900 | 1.60342 | 38.01 |
| 18 | 35.888 | 2.909 | | |
| 19 | 44.156 | 8.576 | 1.43700 | 95.10 |
| 20 | −79.169 | 1.889 | | |
| 21 | 52.565 | 7.048 | 1.43700 | 95.10 |
| 22 | −244.231 | 6.704 | | |
| 23 | 119.405 | 2.300 | 1.80610 | 33.27 |
| 24 | 33.445 | 6.741 | | |
| 25 | 57.398 | 13.455 | 1.43700 | 95.10 |
| 26 | −31.759 | 2.458 | | |
| 27 | −35.781 | 2.400 | 1.80610 | 33.27 |
| 28 | −73.758 | 1.001 | | |
| 29 | 51.735 | 13.186 | 1.43700 | 95.10 |
| 30 | −46.797 | 2.693 | | |
| 31 | −53.685 | 2.400 | 1.62004 | 36.30 |
| 32 | 35.438 | 9.756 | | |
| 33 | 432.749 | 7.971 | 1.80835 | 40.55 |
| 34* | −43.924 | 3.000 | | |
| 35 | 105.769 | 5.549 | 1.85478 | 24.80 |
| 36 | 5665.909 | 3.000 | | |
| 37 | 56.630 | 7.280 | 1.80518 | 25.46 |
| 38 | 447.641 | 6.653 | | |
| 39 | infinity | 21.086 | | |
| 40 | −36.292 | 3.387 | 1.51680 | 64.20 |
| 41 | −34.551 | 2.190 | | |
| 42 | −32.402 | 1.900 | 1.80610 | 33.27 |
| 43 | 180.804 | 8.372 | | |
| 44 | −39.015 | 7.939 | 1.91082 | 35.25 |
| 45 | −29.049 | 15.719 | | |
| 46 | −19257.433 | 10.907 | 1.58913 | 61.25 |
| 47 | −46.615 | 55.715 | | |
| 48(ST) | infinity | 14.650 | | |
| 49 | −561.236 | 5.577 | 1.43700 | 95.10 |
| 50 | −37.861 | 4.374 | | |
| 51 | −33.539 | 1.700 | 1.80610 | 33.27 |
| 52 | 76.892 | 0.700 | | |
| 53 | 43.897 | 8.872 | 1.43700 | 95.10 |
| 54 | −42.213 | 4.772 | | |
| 55 | 92.640 | 6.167 | 1.59282 | 68.62 |
| 56 | −92.912 | 10.029 | | |
| 57 | −27.394 | 2.300 | 1.80610 | 40.73 |
| 58 | 350.203 | 3.046 | | |
| 59 | −1397.982 | 13.087 | 1.55032 | 75.50 |
| 60 | −34.006 | 0.300 | | |
| 61 | 281.555 | 8.032 | 1.80518 | 25.46 |
| 62 | −90.252 | 48.897 | | |
| 63 | infinity | 42.000 | 1.51680 | 64.20 |
| 64 | infinity | 4.000 | | |
| 65 | infinity | 3.000 | 1.48749 | 70.44 |
| 66 | infinity | 1.500 | | |
| image(IM) | infinity | | | | aspherical data

| i | K | A4 | A6 | A8 |
|---|---|---|---|---|
| 5 | 3.2058e−001 | 3.2380e−006 | −1.0990e−009 | 4.9934e−013 |

| i | A10 | A12 | A14 | A16 |
|---|---|---|---|---|
| 5 | −3.2583e−017 | 0.0000e+000 | 0.0000e+000 | 0.0000e+000 | aspherical data

| i | K | A4 | A6 | A8 |
|---|---|---|---|---|
| 34 | 0.0000e+000 | 1.8755e−005 | −2.9859e−008 | 4.1577e−011 |

| i | A10 | A12 | A14 | A16 |
|---|---|---|---|---|
| 34 | −4.0688e−014 | 1.7008e−017 | 0.0000e+000 | 0.0000e+000 | various data

| | |
|---|---|
| Fl | −7.968 |
| Fno. | 2.500 |
| ω | 66.003 |

-continued unit: mm

| | |
|---|---|
| ymax | 17.900 |
| TL | 644.705 |
| BF | 84.102 |

Example 3 unit: mm surface data

| i | r | d | nd | vd |
|---|---|---|---|---|
| object (SC) | infinity | infinity | | |
| 1 | 111.529 | 7.940 | 1.70154 | 41.15 |
| 2 | 55.570 | 16.775 | | |
| 3 | 97.672 | 5.800 | 1.83400 | 37.34 |
| 4 | 49.557 | 10.199 | | |
| 5* | 174.445 | 9.100 | 1.83404 | 37.30 |
| 6 | 34.363 | 18.076 | | |
| 7 | 206.002 | 2.962 | 1.83400 | 37.34 |
| 8 | 46.517 | 16.112 | | |
| 9 | −32.444 | 3.000 | 1.84666 | 23.78 |
| 10 | −435.360 | 9.302 | | |
| 11 | −72.183 | 9.036 | 1.91082 | 35.25 |
| 12 | −50.913 | 4.638 | | |
| 13 | −282.808 | 14.025 | 1.90366 | 31.31 |
| 14 | −63.780 | 0.300 | | |
| 15 | 116.188 | 7.550 | 1.83400 | 37.34 |
| 16 | 401.358 | 49.100 | | |
| 17 | infinity | 50.000 | 1.51680 | 64.20 |
| 18 | infinity | 5.000 | | |
| 19 | 179.592 | 1.800 | 1.60342 | 38.01 |
| 20 | 35.518 | 2.716 | | |
| 21 | 44.037 | 8.476 | 1.43700 | 95.10 |
| 22 | −73.660 | 0.300 | | |
| 23 | 47.439 | 7.638 | 1.43700 | 95.10 |
| 24 | −192.323 | 6.290 | | |
| 25 | 166.874 | 2.200 | 1.80610 | 33.27 |
| 26 | 33.455 | 7.561 | | |
| 27 | 65.301 | 13.684 | 1.43700 | 95.10 |
| 28 | −30.299 | 1.958 | | |
| 29 | −34.243 | 2.300 | 1.80610 | 33.27 |
| 30 | −70.531 | 0.300 | | |
| 31 | 47.808 | 13.039 | 1.43700 | 95.10 |
| 32 | −52.077 | 4.326 | | |
| 33 | −58.926 | 2.400 | 1.62004 | 36.30 |
| 34 | 35.191 | 9.179 | | |
| 35 | 238.697 | 7.988 | 1.80835 | 40.55 |
| 36* | −45.975 | 3.000 | | |
| 37 | 120.120 | 4.894 | 1.85478 | 24.80 |
| 38 | 764.460 | 3.000 | | |
| 39 | 52.401 | 7.997 | 1.80518 | 25.46 |
| 40 | 688.269 | 6.467 | | |
| 41 | infinity | 21.040 | | |
| 42 | −36.871 | 2.739 | 1.51680 | 64.20 |
| 43 | −40.941 | 2.425 | | |
| 44 | −36.223 | 1.900 | 1.80610 | 33.27 |
| 45 | 173.645 | 8.838 | | |
| 46 | −38.807 | 7.943 | 1.91082 | 35.25 |
| 47 | −28.973 | 18.665 | | |
| 48 | 18416.696 | 9.563 | 1.58913 | 61.25 |
| 49 | −48.100 | 56.632 | | |
| 50(ST) | infinity | 13.100 | | |
| 51 | 3755.769 | 5.744 | 1.43700 | 95.10 |
| 52 | −37.867 | 3.161 | | |
| 53 | −34.215 | 1.700 | 1.80610 | 33.27 |
| 54 | 75.158 | 0.719 | | |
| 55 | 43.737 | 8.695 | 1.43700 | 95.10 |
| 56 | −40.733 | 2.042 | | |
| 57 | 85.858 | 5.544 | 1.59282 | 68.62 |
| 58 | −140.739 | 11.850 | | |
| 59 | −26.766 | 2.300 | 1.80610 | 40.73 |
| 60 | 374.900 | 3.086 | | |

-continued unit: mm

| | | | | |
|---|---|---|---|---|
| 61 | −550.729 | 11.955 | 1.55032 | 75.50 |
| 62 | −32.757 | 0.300 | | |
| 63 | 265.957 | 7.796 | 1.80518 | 25.46 |
| 64 | −83.521 | 45.335 | | |
| 65 | infinity | 42.000 | 1.51680 | 64.20 |
| 66 | infinity | 4.000 | | |
| 67 | infinity | 3.000 | 1.48749 | 70.44 |
| 68 | infinity | 1.500 | | |
| image(IM) | infinity | | | | aspherical data

| i | K | A4 | A6 | A8 |
|---|---|---|---|---|
| 5 | −9.1510e−001 | 3.2483e−006 | −1.0990e−009 | 5.0907e−013 |

| i | A10 | A12 | A14 | A16 |
|---|---|---|---|---|
| 5 | −3.2583e−017 | 0.0000e+000 | 0.0000e+000 | 0.0000e+000 | aspherical data

| i | K | A4 | A6 | A8 |
|---|---|---|---|---|
| 36 | 0.0000e+000 | 1.8804e−005 | −2.9859e−008 | 4.1832e−011 |

| i | A10 | A12 | A14 | A16 |
|---|---|---|---|---|
| 36 | −4.0688e−014 | 1.7008e−017 | 0.0000e+000 | 0.0000e+000 | various data

| | |
|---|---|
| Fl | −7.968 |
| Fno. | 2.500 |
| ω | 66.003 |
| ymax | 17.900 |
| TL | 644.706 |
| BF | 80.541 |

Example 4 unit: mm surface data

| i | r | d | nd | vd |
|---|---|---|---|---|
| object (SC) | infinity | infinity | | |
| 1 | 93.044 | 6.325 | 1.83400 | 37.16 |
| 2 | 52.841 | 10.387 | | |
| 3 | 69.302 | 4.677 | 1.91082 | 35.25 |
| 4 | 41.509 | 16.683 | | |
| 5* | 706.256 | 6.160 | 1.80835 | 40.55 |
| 6 | 78.641 | 7.343 | | |
| 7 | 232.643 | 3.164 | 1.80518 | 25.46 |
| 8 | 40.509 | 14.676 | | |
| 9 | −250.133 | 2.601 | 1.59410 | 60.47 |
| 10 | 51.730 | 19.396 | | |
| 11 | −29.417 | 2.840 | 1.84666 | 23.78 |
| 12 | −112.544 | 7.838 | | |
| 13 | −58.719 | 7.434 | 1.91650 | 31.60 |
| 14 | −43.264 | 1.000 | | |
| 15 | −233.847 | 13.900 | 1.83400 | 37.16 |
| 16 | −59.382 | 0.200 | | |
| 17 | 100.995 | 9.436 | 1.83400 | 37.16 |
| 18 | infinity | 71.563 | | |
| 19 | −93.802 | 1.531 | 1.76200 | 40.10 |
| 20 | 43.096 | 3.208 | | |
| 21 | 65.068 | 7.206 | 1.43700 | 95.10 |
| 22 | −47.003 | 0.300 | | |
| 23 | 76.284 | 6.510 | 1.43700 | 95.10 |
| 24 | −70.007 | 2.000 | | |
| 25 | 63.598 | 1.907 | 1.80610 | 40.93 |

-continued unit: mm

| | | | | |
|---|---|---|---|---|
| 26 | 32.523 | 5.302 | | |
| 27 | 52.379 | 7.438 | 1.43700 | 95.10 |
| 28 | −141.175 | 0.300 | | |
| 29 | 58.372 | 12.131 | 1.43700 | 95.10 |
| 30 | −40.041 | 0.303 | | |
| 31 | −64.630 | 2.323 | 1.80610 | 33.27 |
| 32 | 99.723 | 0.300 | | |
| 33 | 43.103 | 10.421 | 1.43700 | 95.10 |
| 34 | −64.806 | 0.300 | | |
| 35 | infinity | 2.307 | 1.80000 | 29.84 |
| 36 | 28.733 | 10.520 | | |
| 37 | 200.231 | 8.680 | 1.80835 | 40.55 |
| 38* | −43.913 | 3.500 | | |
| 39 | 66.962 | 5.533 | 1.80518 | 25.46 |
| 40 | infinity | 4.087 | | |
| 41 | 42.533 | 5.125 | 1.79952 | 42.22 |
| 42 | 106.373 | 7.500 | | |
| 43 | infinity | 16.100 | | |
| 44 | −30.021 | 4.045 | 1.51680 | 64.20 |
| 45 | −22.143 | 1.943 | | |
| 46 | −22.311 | 1.528 | 1.70154 | 41.15 |
| 47 | 62.598 | 7.531 | | |
| 48 | −42.237 | 6.135 | 1.84666 | 23.78 |
| 49 | −23.890 | 18.241 | | |
| 50 | −142.567 | 6.894 | 1.51680 | 64.20 |
| 51 | −32.399 | 33.293 | | |
| 52(ST) | infinity | 5.171 | | |
| 53 | infinity | 5.292 | 1.43700 | 95.10 |
| 54 | −34.573 | 2.309 | | |
| 55 | −32.443 | 1.741 | 1.80000 | 29.84 |
| 56 | 54.105 | 0.971 | | |
| 57 | 40.839 | 10.498 | 1.43700 | 95.10 |
| 58 | −34.933 | 0.316 | | |
| 59 | 70.370 | 4.805 | 1.59282 | 68.62 |
| 60 | −177.660 | 11.478 | | |
| 61 | −24.901 | 2.092 | 1.72342 | 37.99 |
| 62 | 184.006 | 3.275 | | |
| 63 | infinity | 13.182 | 1.55032 | 75.50 |
| 64 | −31.309 | 2.000 | | |
| 65 | 189.191 | 7.297 | 1.80518 | 25.46 |
| 66 | −85.061 | 16.000 | | |
| 67 | infinity | 70.000 | 1.51680 | 64.20 |
| 68 | infinity | 4.000 | | |
| 69 | infinity | 3.000 | 1.48749 | 70.44 |
| 70 | infinity | 1.500 | | |
| image(IM) | infinity | | | | aspherical data

| i | K | A4 | A6 | A8 |
|---|---|---|---|---|
| 5 | 0.0000e+000 | 4.3870e−006 | −2.3855e−009 | 1.2418e−012 |

| i | A10 | A12 | A14 | A16 |
|---|---|---|---|---|
| 5 | −2.2387e−016 | 0.0000e+000 | 0.0000e+000 | 0.0000e+000 | aspherical data

| i | K | A4 | A6 | A8 |
|---|---|---|---|---|
| 38 | 0.0000e+000 | 1.8717e−005 | −2.9859e−008 | 4.1374e−011 |

| i | A10 | A12 | A14 | A16 |
|---|---|---|---|---|
| 38 | −4.0688e−014 | 1.7008e−017 | 0.0000e+000 | 0.0000e+000 | various data

| | |
|---|---|
| Fl | −5.704 |
| Fno. | 2.000 |
| ω | 65.613 |
| ymax | 12.500 |
| TL | 550.168 |
| BF | 69.678 |

Example 5 unit: mm surface data

| i | r | d | nd | vd |
|---|---|---|---|---|
| object (SC) | infinity | infinity | | |
| 1 | 91.772 | 6.105 | 1.83400 | 37.16 |
| 2 | 50.692 | 7.588 | | |
| 3 | 60.460 | 4.522 | 1.91082 | 35.25 |
| 4 | 40.910 | 17.025 | | |
| 5* | 706.256 | 6.160 | 1.80835 | 40.55 |
| 6 | 78.641 | 7.027 | | |
| 7 | 221.447 | 4.027 | 1.80518 | 25.46 |
| 8 | 36.717 | 14.146 | | |
| 9 | −252.189 | 2.391 | 1.80518 | 25.46 |
| 10 | 53.324 | 17.702 | | |
| 11 | −27.506 | 2.675 | 1.84666 | 23.78 |
| 12 | −101.451 | 7.298 | | |
| 13 | −65.006 | 10.126 | 1.91650 | 31.60 |
| 14 | −43.301 | 1.204 | | |
| 15 | −321.078 | 13.100 | 1.80610 | 33.27 |
| 16 | −63.424 | 0.200 | | |
| 17 | 106.234 | 8.768 | 1.80610 | 33.27 |
| 18 | infinity | 71.677 | | |
| 19 | −103.379 | 1.743 | 1.67270 | 32.17 |
| 20 | 41.507 | 3.467 | | |
| 21 | 54.052 | 8.572 | 1.43700 | 95.10 |
| 22 | −53.524 | 0.300 | | |
| 23 | 70.504 | 6.439 | 1.43700 | 95.10 |
| 24 | −107.423 | 2.000 | | |
| 25 | 67.884 | 2.026 | 1.83400 | 37.16 |
| 26 | 32.156 | 7.604 | | |
| 27 | 62.724 | 8.486 | 1.43700 | 95.10 |
| 28 | −94.843 | 0.300 | | |
| 29 | 68.543 | 12.803 | 1.43700 | 95.10 |
| 30 | −42.310 | 0.300 | | |
| 31 | −65.994 | 2.536 | 1.83400 | 37.16 |
| 32 | 214.684 | 0.300 | | |
| 33 | 51.951 | 11.769 | 1.43700 | 95.10 |
| 34 | −53.122 | 0.476 | | |
| 35 | −150.314 | 2.467 | 1.68893 | 31.16 |
| 36 | 28.266 | 13.094 | | |
| 37 | 200.231 | 8.680 | 1.80835 | 40.55 |
| 38* | −43.913 | 3.500 | | |
| 39 | 105.456 | 5.794 | 1.80518 | 25.46 |
| 40 | −183.801 | 5.317 | | |
| 41 | 71.508 | 4.563 | 1.80420 | 46.50 |
| 42 | 274.312 | 7.685 | | |
| 43 | infinity | 16.681 | | |
| 44 | −27.113 | 5.020 | 1.51680 | 64.20 |
| 45 | −21.220 | 1.944 | | |
| 46 | −21.517 | 1.660 | 1.64769 | 33.84 |
| 47 | 63.050 | 8.154 | | |
| 48 | −49.179 | 7.646 | 1.80518 | 25.46 |
| 49 | −26.482 | 16.367 | | |
| 50 | −198.687 | 8.119 | 1.51680 | 64.20 |
| 51 | −35.258 | 45.643 | | |
| 52(ST) | infinity | 1.192 | | |
| 53 | 47.074 | 7.095 | 1.43700 | 95.10 |
| 54 | −43.558 | 2.618 | | |
| 55 | −36.725 | 1.639 | 1.80100 | 34.97 |
| 56 | 44.086 | 1.308 | | |
| 57 | 36.309 | 8.955 | 1.43700 | 95.10 |
| 58 | −35.109 | 1.367 | | |
| 59 | 66.048 | 4.080 | 1.59282 | 68.62 |
| 60 | −182.818 | 10.502 | | |
| 61 | −25.044 | 1.750 | 1.83400 | 37.16 |
| 62 | 162.890 | 3.362 | | |
| 63 | −279.375 | 8.584 | 1.55032 | 75.50 |
| 64 | −27.866 | 6.489 | | |
| 65 | 383.777 | 6.394 | 1.80518 | 25.46 |
| 66 | −53.648 | 21.946 | | |
| 67 | infinity | 26.000 | 1.51680 | 64.20 |
| 68 | infinity | 4.000 | | |
| 69 | infinity | 3.000 | 1.48749 | 70.44 |
| 70 | infinity | 1.500 | | |
| image(IM) | infinity | | | | aspherical data

| i | K | A4 | A6 | A8 |
|---|---|---|---|---|
| 5 | 0.0000e+000 | 4.3870e−006 | −2.3855e−009 | 1.2418e−012 |

| i | A10 | A12 | A14 | A16 |
|---|---|---|---|---|
| 5 | −2.2387e−016 | 0.0000e+000 | 0.0000e+000 | 0.0000e+000 | aspherical data

| i | K | A4 | A6 | A8 |
|---|---|---|---|---|
| 38 | 0.0000e+000 | 1.8717e−005 | −2.9859e−008 | 4.1374e−011 |

| i | A10 | A12 | A14 | A16 |
|---|---|---|---|---|
| 38 | −4.0688e−014 | 1.7008e−017 | 0.0000e+000 | 0.0000e+000 | various data

| Fl | −5.695 |
|---|---|
| Fno. | 2.000 |
| ω | 65.612 |
| ymax | 12.500 |
| TL | 545.171 |
| BF | 46.637 |

Example 6 unit: mm surface data

| i | r | d | nd | vd |
|---|---|---|---|---|
| object (SC) | infinity | infinity | | |
| 1 | 83.582 | 5.610 | 1.83400 | 37.16 |
| 2 | 46.688 | 9.922 | | |
| 3 | 62.384 | 4.103 | 1.91082 | 35.25 |
| 4 | 37.498 | 15.770 | | |
| 5* | 706.256 | 6.160 | 1.80835 | 40.55 |
| 6 | 78.641 | 5.271 | | |
| 7 | 142.504 | 2.762 | 1.80518 | 25.46 |
| 8 | 37.524 | 14.951 | | |
| 9 | −84.063 | 2.266 | 1.80518 | 25.46 |
| 10 | 70.699 | 16.575 | | |
| 11 | −26.458 | 2.598 | 1.84666 | 23.78 |
| 12 | −76.584 | 5.793 | | |
| 13 | −54.186 | 8.360 | 1.91650 | 31.60 |
| 14 | −38.339 | 1.000 | | |
| 15 | −274.154 | 12.217 | 1.83400 | 37.16 |
| 16 | −59.597 | 0.200 | | |
| 17 | 98.283 | 8.463 | 1.80000 | 29.84 |
| 18 | infinity | 71.904 | | |
| 19 | −65.779 | 1.467 | 1.64769 | 33.84 |
| 20 | 44.065 | 3.713 | | |
| 21 | 88.632 | 6.625 | 1.43700 | 95.10 |
| 22 | −44.943 | 0.300 | | |
| 23 | 91.708 | 6.005 | 1.43700 | 95.10 |
| 24 | −69.118 | 2.000 | | |
| 25 | 80.851 | 1.891 | 1.83400 | 37.16 |
| 26 | 35.147 | 5.136 | | |
| 27 | 58.774 | 8.152 | 1.43700 | 95.10 |
| 28 | −85.779 | 0.300 | | |
| 29 | 83.144 | 11.589 | 1.43700 | 95.10 |
| 30 | −38.161 | 0.300 | | |
| 31 | −57.852 | 2.400 | 1.83400 | 37.16 |

21
-continued unit: mm

| | | | | |
|---|---|---|---|---|
| 32 | infinity | 6.421 | | |
| 33 | 69.265 | 10.826 | 1.43700 | 95.10 |
| 34 | −45.174 | 0.300 | | |
| 35 | −100.964 | 2.416 | 1.67270 | 32.17 |
| 36 | 28.474 | 12.593 | | |
| 37 | 200.231 | 8.680 | 1.80835 | 40.55 |
| 38* | −43.913 | 3.500 | | |
| 39 | 91.121 | 6.579 | 1.80518 | 25.46 |
| 40 | −182.546 | 3.970 | | |
| 41 | 39.363 | 6.551 | 1.65100 | 56.16 |
| 42 | 123.553 | 7.500 | | |
| 43 | infinity | 16.801 | | |
| 44 | −26.718 | 4.707 | 1.51680 | 64.20 |
| 45 | −19.484 | 2.082 | | |
| 46 | −19.266 | 1.278 | 1.62004 | 36.30 |
| 47 | 33.600 | 7.013 | | |
| 48 | −44.709 | 5.131 | 1.84666 | 23.78 |
| 49 | −22.609 | 14.802 | | |
| 50 | −70.191 | 5.173 | 1.51680 | 64.20 |
| 51 | −25.069 | 25.022 | | |
| 52(ST) | infinity | 7.348 | | |
| 53 | 34.984 | 7.295 | 1.43700 | 95.10 |
| 54 | −37.828 | 2.569 | | |
| 55 | −31.395 | 1.383 | 1.80610 | 33.27 |
| 56 | 46.299 | 0.305 | | |
| 57 | 27.848 | 8.532 | 1.43700 | 95.10 |
| 58 | −36.751 | 0.300 | | |
| 59 | 56.629 | 4.007 | 1.59282 | 68.62 |
| 60 | −131.973 | 8.057 | | |
| 61 | −21.238 | 1.457 | 1.83400 | 37.16 |
| 62 | 73.424 | 3.637 | | |
| 63 | infinity | 7.571 | 1.55032 | 75.50 |
| 64 | −28.565 | 2.199 | | |
| 65 | −543.428 | 6.669 | 1.80518 | 25.46 |
| 66 | −38.343 | 19.000 | | |
| 67 | infinity | 26.000 | 1.51680 | 64.20 |
| 68 | infinity | 4.000 | | |
| 69 | infinity | 3.000 | 1.48749 | 70.44 |
| 70 | infinity | 1.500 | | |
| image(IM) | infinity | | | | aspherical data

| i | K | A4 | A6 | A8 |
|---|---|---|---|---|
| 5 | 0.0000e+000 | 4.3870e−006 | −2.3855e−009 | 1.2418e−012 |

| i | A10 | A12 | A14 | A16 |
|---|---|---|---|---|
| 5 | −2.2387e−016 | 0.0000e+000 | 0.0000e+000 | 0.0000e+000 | aspherical data

| i | K | A4 | A6 | A8 |
|---|---|---|---|---|
| 38 | 0.0000e+000 | 1.8717e−005 | −2.9859e−008 | 4.1374e−011 |

| i | A10 | A12 | A14 | A16 |
|---|---|---|---|---|
| 38 | −4.0688e−014 | 1.7008e−017 | 0.0000e+000 | 0.0000e+000 | various data

| | |
|---|---|
| Fl | −5.686 |
| Fno. | 2.401 |
| ω | 65.648 |
| ymax | 12.500 |
| TL | 500.168 |
| BF | 43.692 |

Example 7 unit: mm surface data

| i | r | d | nd | vd |
|---|---|---|---|---|
| object (SC) | infinity | infinity | | |
| 1 | 82.295 | 6.268 | 1.83400 | 37.16 |
| 2 | 50.997 | 10.444 | | |
| 3 | 67.807 | 4.696 | 1.91082 | 35.25 |
| 4 | 40.695 | 15.206 | | |
| 5* | 706.256 | 6.160 | 1.80835 | 40.55 |
| 6 | 78.641 | 1.058 | | |
| 7 | 64.144 | 3.530 | 1.91082 | 35.25 |
| 8 | 34.787 | 15.994 | | |
| 9 | 208.994 | 2.640 | 1.80518 | 25.46 |
| 10 | 34.055 | 19.360 | | |
| 11 | −28.050 | 3.290 | 1.84666 | 23.78 |
| 12 | −194.354 | 8.072 | | |
| 13 | −62.553 | 9.280 | 1.91082 | 35.25 |
| 14 | −45.280 | 1.070 | | |
| 15 | −321.404 | 13.265 | 1.80518 | 25.46 |
| 16 | −58.480 | 0.200 | | |
| 17 | 126.248 | 6.870 | 1.78590 | 44.20 |
| 18 | infinity | 70.000 | | |
| 19 | 266.334 | 2.020 | 1.80610 | 33.27 |
| 20 | 43.222 | 2.747 | | |
| 21 | 49.574 | 10.210 | 1.43700 | 95.10 |
| 22 | −62.286 | 0.606 | | |
| 23 | 37.939 | 8.830 | 1.43700 | 95.10 |
| 24 | infinity | 2.001 | | |
| 25 | 70.370 | 2.200 | 1.83400 | 37.16 |
| 26 | 28.957 | 13.459 | | |
| 27 | 152.602 | 5.820 | 1.43700 | 95.10 |
| 28 | −110.593 | 0.300 | | |
| 29 | 77.298 | 13.770 | 1.43700 | 95.10 |
| 30 | −42.111 | 0.389 | | |
| 31 | −77.298 | 3.070 | 1.80610 | 40.93 |
| 32 | 384.910 | 2.000 | | |
| 33 | 32.680 | 14.215 | 1.43700 | 95.10 |
| 34 | −74.310 | 0.720 | | |
| 35 | −119.291 | 2.415 | 1.83400 | 37.16 |
| 36 | 28.527 | 11.259 | | |
| 37 | 200.231 | 8.680 | 1.80835 | 40.55 |
| 38* | −43.913 | 2.000 | | |
| 39 | 58.461 | 6.460 | 1.83400 | 37.16 |
| 40 | infinity | 13.847 | | |
| 41 | infinity | 21.725 | | |
| 42 | −31.355 | 5.610 | 1.51680 | 64.20 |
| 43 | −25.637 | 12.399 | | |
| 44 | −22.107 | 2.461 | 1.76182 | 26.61 |
| 45 | infinity | 8.007 | | |
| 46 | −39.411 | 7.132 | 1.80518 | 25.46 |
| 47 | −27.737 | 7.997 | | |
| 48 | infinity | 9.908 | 1.71300 | 53.94 |
| 49 | −46.737 | 64.697 | | |
| 50(ST) | infinity | 5.604 | | |
| 51 | 58.399 | 5.387 | 1.43700 | 95.10 |
| 52 | −38.828 | 2.748 | | |
| 53 | −30.365 | 1.304 | 1.80610 | 33.27 |
| 54 | 64.151 | 0.543 | | |
| 55 | 27.287 | 9.031 | 1.43700 | 95.10 |
| 56 | −38.242 | 2.000 | | |
| 57 | 98.826 | 4.393 | 1.43700 | 95.10 |
| 58 | −58.829 | 6.840 | | |
| 59 | −19.414 | 1.954 | 1.54814 | 45.82 |
| 60 | 54.188 | 4.373 | | |
| 61 | infinity | 7.217 | 1.43700 | 95.10 |
| 62 | −29.354 | 4.073 | | |
| 63 | 659.544 | 6.666 | 1.80518 | 25.46 |
| 64 | −46.816 | 19.000 | | |
| 65 | infinity | 26.000 | 1.51680 | 64.20 |
| 66 | infinity | 4.000 | | |
| 67 | infinity | 3.000 | 1.48749 | 70.44 |
| 68 | infinity | 1.500 | | |
| image(IM) | infinity | | | | unit: mm aspherical data

| i | K | A4 | A6 | A8 |
|---|---|---|---|---|
| 5 | 0.0000e+000 | 4.3870e−006 | −2.3855e−009 | 1.2418e−012 |

| i | A10 | A12 | A14 | A16 |
|---|---|---|---|---|
| 5 | −2.2387e−016 | 0.0000e+000 | 0.0000e+000 | 0.0000e+000 | aspherical data

| i | K | A4 | A6 | A8 |
|---|---|---|---|---|
| 38 | 0.0000e+000 | 1.8717e−005 | −2.9859e−008 | 4.1374e−011 |

| i | A10 | A12 | A14 | A16 |
|---|---|---|---|---|
| 38 | −4.0688e−014 | 1.7008e−017 | 0.0000e+000 | 0.0000e+000 | various data

| | |
|---|---|
| Fl | −5.702 |
| Fno. | 2.400 |
| ω | 65.646 |
| ymax | 12.500 |
| TL | 570.162 |
| BF | 43.674 |

Example 8 unit: mm surface data

| i | r | d | nd | vd |
|---|---|---|---|---|
| object (SC) | infinity | infinity | | |
| 1 | 82.295 | 6.268 | 1.83400 | 37.16 |
| 2 | 50.997 | 10.444 | | |
| 3 | 67.807 | 4.696 | 1.91082 | 35.25 |
| 4 | 40.695 | 15.206 | | |
| 5* | 706.256 | 6.160 | 1.80835 | 40.55 |
| 6 | 78.641 | 1.058 | | |
| 7 | 64.144 | 3.530 | 1.91082 | 35.25 |
| 8 | 34.787 | 15.994 | | |
| 9 | 208.994 | 2.640 | 1.80518 | 25.46 |
| 10 | 34.055 | 19.360 | | |
| 11 | −28.050 | 3.290 | 1.84666 | 23.78 |
| 12 | −194.354 | 8.072 | | |
| 13 | −62.553 | 9.280 | 1.91082 | 35.25 |
| 14 | −45.280 | 1.070 | | |
| 15 | −321.404 | 13.265 | 1.80518 | 25.46 |
| 16 | −58.480 | 0.200 | | |
| 17 | 126.248 | 6.870 | 1.78590 | 44.20 |
| 18 | infinity | 70.000 | | |
| 19 | 266.334 | 2.020 | 1.80610 | 33.27 |
| 20 | 43.222 | 2.747 | | |
| 21 | 49.574 | 10.210 | 1.43700 | 95.10 |
| 22 | −62.286 | 0.606 | | |
| 23 | 37.939 | 8.830 | 1.43700 | 95.10 |
| 24 | infinity | 2.001 | | |
| 25 | 70.370 | 2.200 | 1.83400 | 37.16 |
| 26 | 28.957 | 13.459 | | |
| 27 | 152.602 | 5.820 | 1.43700 | 95.10 |
| 28 | −110.593 | 0.300 | | |
| 29 | 77.298 | 13.770 | 1.43700 | 95.10 |
| 30 | −42.111 | 0.389 | | |
| 31 | −77.298 | 3.070 | 1.80610 | 40.93 |
| 32 | 384.910 | 2.000 | | |
| 33 | 32.680 | 14.215 | 1.43700 | 95.10 |
| 34 | −74.310 | 0.720 | | |
| 35 | −119.291 | 2.415 | 1.83400 | 37.16 |
| 36 | 28.527 | 11.259 | | |
| 37 | 200.231 | 8.680 | 1.80835 | 40.55 |
| 38* | −43.913 | 2.000 | | |
| 39 | 58.461 | 6.460 | 1.83400 | 37.16 |
| 40 | infinity | 13.847 | | |
| 41 | infinity | 21.725 | | |
| 42 | −31.355 | 5.610 | 1.51680 | 64.20 |
| 43 | −25.637 | 12.399 | | |
| 44 | −22.107 | 2.461 | 1.76182 | 26.61 |
| 45 | infinity | 8.007 | | |
| 46 | −39.411 | 7.132 | 1.80518 | 25.46 |
| 47 | −27.737 | 7.997 | | |
| 48 | infinity | 9.908 | 1.71300 | 53.94 |
| 49 | −46.737 | 64.697 | | |
| 50(ST) | infinity | 5.604 | | |
| 51 | 58.399 | 5.387 | 1.43700 | 95.10 |
| 52 | −38.828 | 2.748 | | |
| 53 | −30.365 | 1.304 | 1.80610 | 33.27 |
| 54 | 64.151 | 0.543 | | |
| 55 | 27.287 | 9.031 | 1.43700 | 95.10 |
| 56 | −38.242 | 2.000 | | |
| 57 | 98.826 | 4.393 | 1.43700 | 95.10 |
| 58 | −58.829 | 6.840 | | |
| 59 | −19.414 | 1.954 | 1.54814 | 45.82 |
| 60 | 54.188 | 4.373 | | |
| 61 | infinity | 7.217 | 1.43700 | 95.10 |
| 62 | −29.354 | 4.073 | | |
| 63 | 659.544 | 6.666 | 1.80518 | 25.46 |
| 64 | −46.816 | 19.000 | | |
| 65 | infinity | 26.000 | 1.51680 | 64.20 |
| 66 | infinity | 4.000 | | |
| 67 | infinity | 3.000 | 1.48749 | 70.44 |
| 68 | infinity | 1.500 | | |
| image(IM) | infinity | | | | aspherical data

| i | K | A4 | A6 | A8 |
|---|---|---|---|---|
| 5 | 0.0000e+000 | 4.3870e−006 | −2.3855e−009 | 1.2418e−012 |

| i | A10 | A12 | A14 | A16 |
|---|---|---|---|---|
| 5 | −2.2387e−016 | 0.0000e+000 | 0.0000e+000 | 0.0000e+000 | aspherical data

| i | K | A4 | A6 | A8 |
|---|---|---|---|---|
| 38 | 0.0000e+000 | 1.8717e−005 | −2.9859e−008 | 4.1374e−011 |

| i | A10 | A12 | A14 | A16 |
|---|---|---|---|---|
| 38 | −4.0688e−014 | 1.7008e−017 | 0.0000e+000 | 0.0000e+000 | various data

| | |
|---|---|
| Fl | −5.702 |
| Fno. | 2.400 |
| ω | 65.646 |
| ymax | 12.500 |
| TL | 570.162 |
| BF | 43.674 |

TABLE 1

| values corresponding to conditional formulae, etc. | example 1 | example 2 | example 3 | example 4 |
|---|---|---|---|---|
| (1) T1 > T3 | 1.81 | 2.00 | 2.08 | 2.06 |
| (2) T2/T3 | 2.42 | 2.76 | 2.94 | 2.62 |
| (3) T2/Tw | 0.33 | 0.34 | 0.34 | 0.36 |
| T1 | 136.1 | 138.0 | 134.8 | 134.5 |
| T2 | 182.7 | 190.4 | 190.6 | 171.1 |

TABLE 1-continued

| values corresponding to conditional formulae, etc. | example 1 | example 2 | example 3 | example 4 |
|---|---|---|---|---|
| T3 | 75.4 | 69.0 | 64.9 | 65.3 |
| Tw | 550.4 | 560.6 | 564.2 | 480.5 |

TABLE 2

| values corresponding to conditional formulae, etc. | example 5 | example 6 | example 7 | example 8 |
|---|---|---|---|---|
| (1) T1 > T3 | 2.03 | 2.27 | 2.26 | 2.57 |
| (2) T2/T3 | 2.90 | 3.26 | 3.58 | 4.03 |
| (3) T2/Tw | 0.37 | 0.39 | 0.38 | 0.41 |
| T1 | 130.4 | 122.4 | 127.8 | 130.6 |
| T2 | 185.8 | 176.2 | 202.3 | 204.2 |
| T3 | 64.1 | 54.0 | 56.5 | 50.7 |
| Tw | 498.5 | 456.5 | 526.5 | 500.5 |

<Projection Apparatus>

Figure 25:
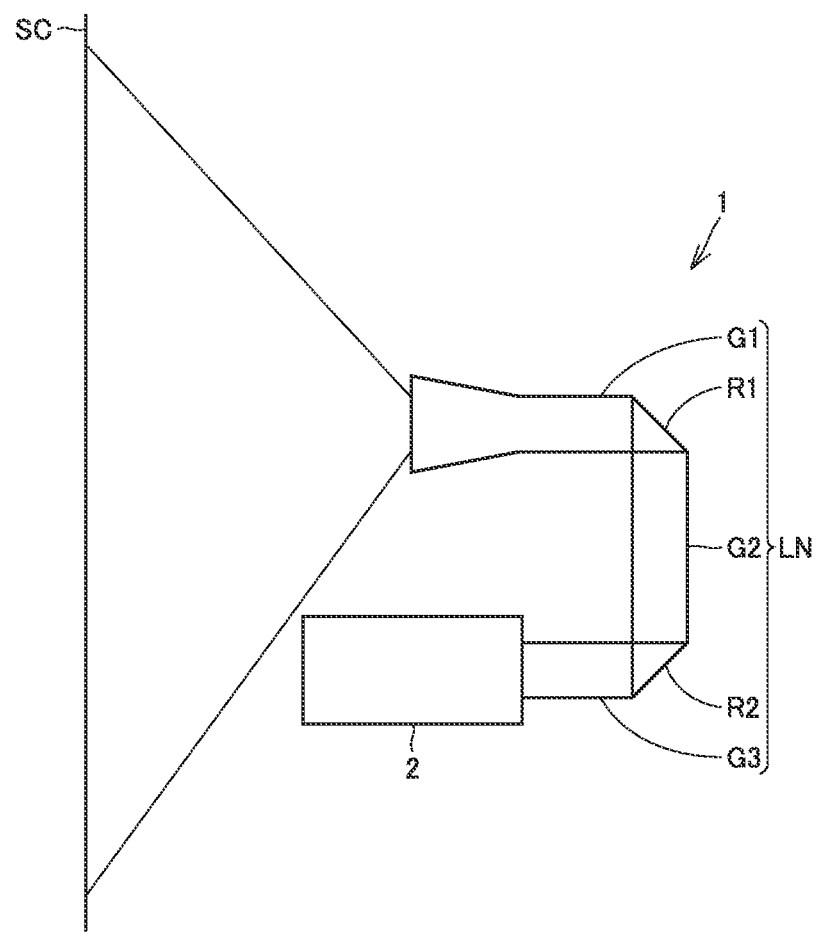
FIG. 25 is a schematic diagram showing one or more embodiments of a projection apparatus.
Figure 26:
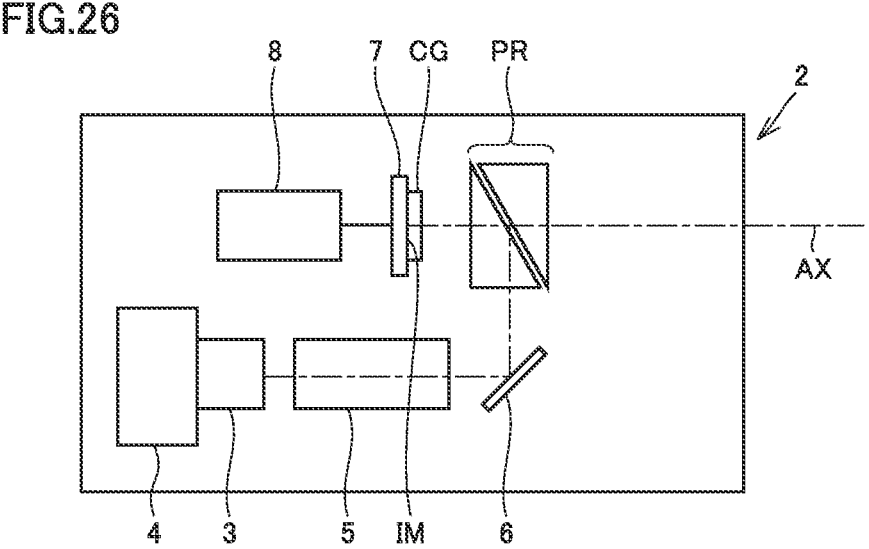
FIG. 26 is a schematic diagram of the main body of the projection apparatus shown in FIG. 25.

With reference to FIGS. 25 and 26, projection apparatus 1 according to one or more embodiments of the present invention will be described. As shown in FIG. 25, projection apparatus 1 includes a main body 2 and projection optical system LN. Projection optical system LN is any one of projection optical systems LN1 to LN8 of the above-described embodiments.

As shown in FIG. 26, main body 2 includes a light source 3, a cooling member 4, an illumination optical system 5, a reflecting mirror 6, prism PR, image display element 7, and a controller 8.

Light source 3 is, for example, a white light source such as a xenon lamp, or a laser light source. Cooling member 4 cools light source 3 and the like. Cooling member 4 is, for example, a blower. Image display element 7 has image display surface IM. Image display element 7 is, for example, a digital micromirror device (DMD), a liquid crystal display device (LCD) or the like. Cover glass CG is provided on image display surface IM of image display element 7. Controller 8 controls projection apparatus 1. Specifically, controller 8 controls image display element 7 and the like.

Light source 3 emits illumination light which in turn passes through illumination optical system 5, reflecting mirror 6, and prism PR and is thus incident on image display element 7. Image display element 7 modulates the illumination light and reflects image light. Prism PR includes, for example, a TIR prism or the like, and separates illumination light and image light from each other. Prism PR further includes, for example, a color separation/combination prism. When projection apparatus 1 is a three-plate projection apparatus, prism PR combines three image lights formed by three image display elements 7. Projection optical system LN enlarges the image light formed by image display element 7 and projects it toward screen surface SC. Specifically, second optical system LU2 forms intermediate image IM2 of an image displayed on image display surface IM of image display element 7, and first optical system LU1 enlarges and projects intermediate image IM2 on screen surface SC.

An actuator (not shown) for moving a lens along optical axis AX is connected to a lens or a lens group of projection optical system LN that is movable for focusing. Controller 8 controls the actuator to move the lens or the lens group. Note that the lens or the lens group may be manually moved without using controller 8 or the actuator. When image display element 7 is a self-luminous image display element 7, light source 3, illumination optical system 5, and reflecting mirror 6 may be dispensed with.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A projection optical system that enlarges and projects an image displayed on an image display surface, the projection optical system comprising:
a first optical system and a second optical system disposed in that order from an enlargement side, wherein
the second optical system forms an intermediate image of the image,
the first optical system enlarges and projects the intermediate image,
the first optical system comprises:
a first lens group, a first reflecting optical element, and a part of a second lens group, disposed in that order from the enlargement side,
the second optical system comprises:
a remainder of the second lens group, a second reflecting optical element, and a third lens group, disposed in that order from the enlargement side,
the second reflecting optical element reflects light output from the third lens group toward the second lens group,
the first reflecting optical element reflects light output from the second lens group toward the first lens group,
the first lens group and the third lens group are disposed on a projection side with respect to the second lens group, and
the following conditional formula (1) is satisfied:

$$T1/T3>1.0 \tag{1}$$

where
T1 is a distance on an optical axis from a surface of the first lens group closest to the enlargement side to a surface of the first lens group closest to a reduction side, and
T3 is a distance on the optical axis from a surface of the third lens group closest to the enlargement side to a surface of the third lens group closest to the reduction side,
the following conditional formula (2) is satisfied:

$$1.5<T2/T3<5.0 \tag{2}$$

where
T2 is a distance on the optical axis from a surface of the second lens group closest to the enlargement side to a surface of the second lens group closest to the reduction side.

2. The projection optical system according to claim 1, wherein the following conditional formula (3) is satisfied:

$$0.3<T2/Tw<0.5 \tag{3}$$

where
Tw is a distance on the optical axis from a surface of the projection optical system closest to the enlargement side to a surface of the projection optical system closest to the reduction side.

3. The projection optical system according to claim 1, wherein the projection optical system functions as a monofocal lens that projects at an angle of view of 100° or larger.

4. The projection optical system according to claim 1, wherein an optical axis of the first lens group is parallel to an optical axis of the third lens group.

5. The projection optical system according to claim 1, wherein the first reflecting optical element bends an optical path of the projection optical system at a first angle of 90°.

6. The projection optical system according to claim 1, wherein the second reflecting optical element bends an optical path of the projection optical system at a second angle of 90°.

7. The projection optical system according to claim 1, wherein the first reflecting optical element or the second reflecting optical element is a plane mirror.

8. The projection optical system according to claim 1, wherein
the first reflecting optical element or the second reflecting optical element is a right-angle prism comprising an oblique side as a reflecting surface.

9. A projection apparatus comprising:
an image display element comprising the image display surface; and
the projection optical system according to claim 1 that enlarges and projects the image displayed on the image display surface.

10. A projection optical system that enlarges and projects an image displayed on an image display surface, the projection optical system comprising:
a first optical system and a second optical system disposed in that order from an enlargement side, wherein
the second optical system forms an intermediate image of the image, the first optical system enlarges and projects the intermediate image,
the first optical system comprises: a first lens group, a first reflecting optical element, and a part of a second lens group, disposed in that order from the enlargement side,
the second optical system comprises: a remainder of the second lens group, a second reflecting optical element, and a third lens group, disposed in that order from the enlargement side,
the second reflecting optical element reflects light output from the third lens group toward the second lens group,
the first reflecting optical element reflects light output from the second lens group toward the first lens group,
the first lens group and the third lens group are disposed on a projection side with respect to the second lens group,
the following conditional formulas (1) and (3) are satisfied:

$$T1/T3 > 1.0 \tag{1}$$

$$0.3 < T2/Tw < 0.5 \tag{3}$$

where
T1 is a distance on an optical axis from a surface of the first lens group closest to the enlargement side to a surface of the first lens group closest to a reduction side,
T2 is a distance on the optical axis from a surface of the second lens group closest to the enlargement side to a surface of the second lens group closest to the reduction side,
T3 is a distance on the optical axis from a surface of the third lens group closest to the enlargement side to a surface of the third lens group closest to the reduction side, and
Tw is a distance on the optical axis from a surface of the projection optical system closest to the enlargement side to a surface of the projection optical system closest to the reduction side.

11. The projection optical system according to claim 10, wherein the projection optical system functions as a monofocal lens that projects at an angle of view of 100 degrees or larger.

12. The projection optical system according to claim 10, wherein an optical axis of the first lens group is parallel to an optical axis of the third lens group.

13. The projection optical system according to claim 10, wherein the first reflecting optical element bends an optical path of the projection optical system at a first angle of 90 degrees.

14. The projection optical system according to claim 10, wherein the second reflecting optical element bends an optical path of the projection optical system at a second angle of 90 degrees.

15. The projection optical system according to claim 10, wherein the first reflecting optical element or the second reflecting optical element is a plane mirror.

16. The projection optical system according to claim 10, wherein the first reflecting optical element or the second reflecting optical element is a right-angle prism comprising an oblique side as a reflecting surface.

17. A projection apparatus comprising: an image display element comprising the image display surface; and the projection optical system according to claim 10 that enlarges and projects the image displayed on the image display surface.

* * * * *